United States Patent
Rapalli et al.

(10) Patent No.: US 12,072,764 B2
(45) Date of Patent: Aug. 27, 2024

(54) COMMAND AND DATA PATH ERROR PROTECTION

(71) Applicant: Micron Technology, Inc., Boise, ID (US)

(72) Inventors: Chandrakanth Rapalli, Hyderabad (IN); Yoav Weinberg, Toronto (CA); Tal Sharifie, Lehavim (IL)

(73) Assignee: Micron Technology, Inc., Boise, ID (US)

( * ) Notice: Subject to any disclaimer, the term of this patent is extended or adjusted under 35 U.S.C. 154(b) by 35 days.

(21) Appl. No.: 18/048,283

(22) Filed: Oct. 20, 2022

(65) Prior Publication Data

US 2024/0134746 A1   Apr. 25, 2024
US 2024/0232014 A9   Jul. 11, 2024

(51) Int. Cl.
*G06F 11/10*   (2006.01)

(52) U.S. Cl.
CPC .......... *G06F 11/108* (2013.01); *G06F 11/106* (2013.01)

(58) Field of Classification Search
CPC .............................. G06F 11/108; G06F 11/106
See application file for complete search history.

(56) References Cited

U.S. PATENT DOCUMENTS

| | | | |
|---|---|---|---|
| 9,450,609 B1 * | 9/2016 | Schmit | H03M 13/05 |
| 2012/0246443 A1 * | 9/2012 | Meir | G06F 11/1096 |
| | | | 711/E12.078 |
| 2013/0091400 A1 * | 4/2013 | Xia | G11B 20/1833 |
| | | | 714/755 |
| 2016/0294413 A1 * | 10/2016 | Schmit | H03M 13/05 |
| 2016/0357632 A1 * | 12/2016 | d'Abreu | G06F 11/1072 |
| 2017/0255519 A1 * | 9/2017 | Zhang | H03M 13/356 |
| 2018/0032395 A1 * | 2/2018 | Yang | H03M 13/154 |
| 2018/0358987 A1 * | 12/2018 | Zhang | G06F 11/00 |

* cited by examiner

Primary Examiner — Samir W Rizk
(74) Attorney, Agent, or Firm — Holland & Hart LLP

(57) ABSTRACT

Methods, systems, and devices for command and data path error protection are described. In some examples, a memory system may receive data units from a host device. The data units may include respective sets of parity bits, and the memory system may perform an error detection operation on the data units. A first controller of the memory system may generate a protocol unit using data (e.g., a subset of data) from the data units. The protocol unit may include a set of parity bits (e.g., a different set of parity bits), and a second controller of the memory system may perform an error detection operation on the protocol unit. The second controller of the memory system may generate a data storage unit using data (e.g., a subset of data) from the protocol unit, and may store the data unit and another set of parity bits to a memory device.

25 Claims, 11 Drawing Sheets

| Layer | Layer Name | Functionality | Data Unit Name |
|---|---|---|---|
| LA | Application | Payload | Message |
| Layer 4 | Transport | Flow Control | Segment |
| Layer 3 | Network | Addressing | Packet |
| Layer 2 | Data Link | Frames | Frame |
| Layer 1.5 | PHY Adapter | Physical Layer Abstraction | UniPro Symbol |
| Layer 1 | PHY | Signaling, Clocking, Encoding | PHY Symbol |

COMMAND AND DATA PATH ERROR PROTECTION

FIELD OF TECHNOLOGY

The following relates to one or more systems for memory, including command and data path error protection.

BACKGROUND

Memory devices are widely used to store information in various electronic devices such as computers, user devices, wireless communication devices, cameras, digital displays, and the like. Information is stored by programming memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read (e.g., sense, detect, retrieve, identify, determine, evaluate) the state of one or more memory cells within the memory device. To store information, a component may write (e.g., program, set, assign) one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), 3-dimensional cross-point memory (3D cross point), not-or (NOR) and not-and (NAND) memory devices, and others. Memory devices may be described in terms of volatile configurations or non-volatile configurations. Volatile memory cells (e.g., DRAM) may lose their programmed states over time unless they are periodically refreshed by an external power source. Non-volatile memory cells (e.g., NAND) may maintain their programmed states for extended periods of time even in the absence of an external power source.

DETAILED DESCRIPTION

Some memory systems may include circuitry configured to detect errors associated with various operations or various components of the memory system. Such memory systems may be incorporated in environments such as vehicle safety systems, autonomous vehicle systems, or other safety-critical systems, that may have strict requirements. For example, a memory system may include error detection capabilities for data communicated between the memory system and a host device. However, in some instances, errors or faults associated with a data path of the memory system may go undetected. That is, if a fault exists in a data path of a memory system, data may still be written to or read from a memory device, but the data may be corrupt. Accordingly, a memory system configured to detect errors or faults in a data path may be desirable.

A memory system configured to detect errors or faults in a data path is described herein. In some examples, the memory system may be configured to detect errors or faults in the data path by generating one or more sets of parity bits associated with data units received from a host device. For example, a controller (e.g., an interface controller, a Uni-Pro® controller) of the memory system may receive a plurality of data units from a host device and each data unit may include one or more fields. In some instances, each data unit may include a respective set of parity bits. The controller may perform an error detection operation on the respective data units to identify any potential errors in the data. When no errors are present, the interface controller may generate a protocol unit (e.g., a Universal Flash Storage Protocol Information Unit (UPIU)) based on data included in each of the received data units. The interface controller may also generate respective sets of parity bits that are included in the UPIU.

In some examples, the interface controller may communicate the UPIU to a data storage controller, which may process the UPIU. For example, the data storage controller may perform an error detection operation to identify any potential errors in the UPIU (e.g., using the respective sets of parity bits). When no errors are present, the data storage controller may process the UPIU to obtain a data storage unit. The data storage controller may also generate respective sets of parity bits that are included in the data storage unit. In some examples, the data and parity bits included in the data storage unit may be written to a memory device of the memory system. In other examples, as described herein, parity bits may also be generated, and error detection operations may be performed on data that is read from a memory device of the memory system. Accordingly, by generating parity bits (and performing error detection operations) associated with the UPIU and data storage unit, errors that occur along the data path of the memory system may be detected, which may improve the overall performance and reliability of the memory system.

Figure 1:
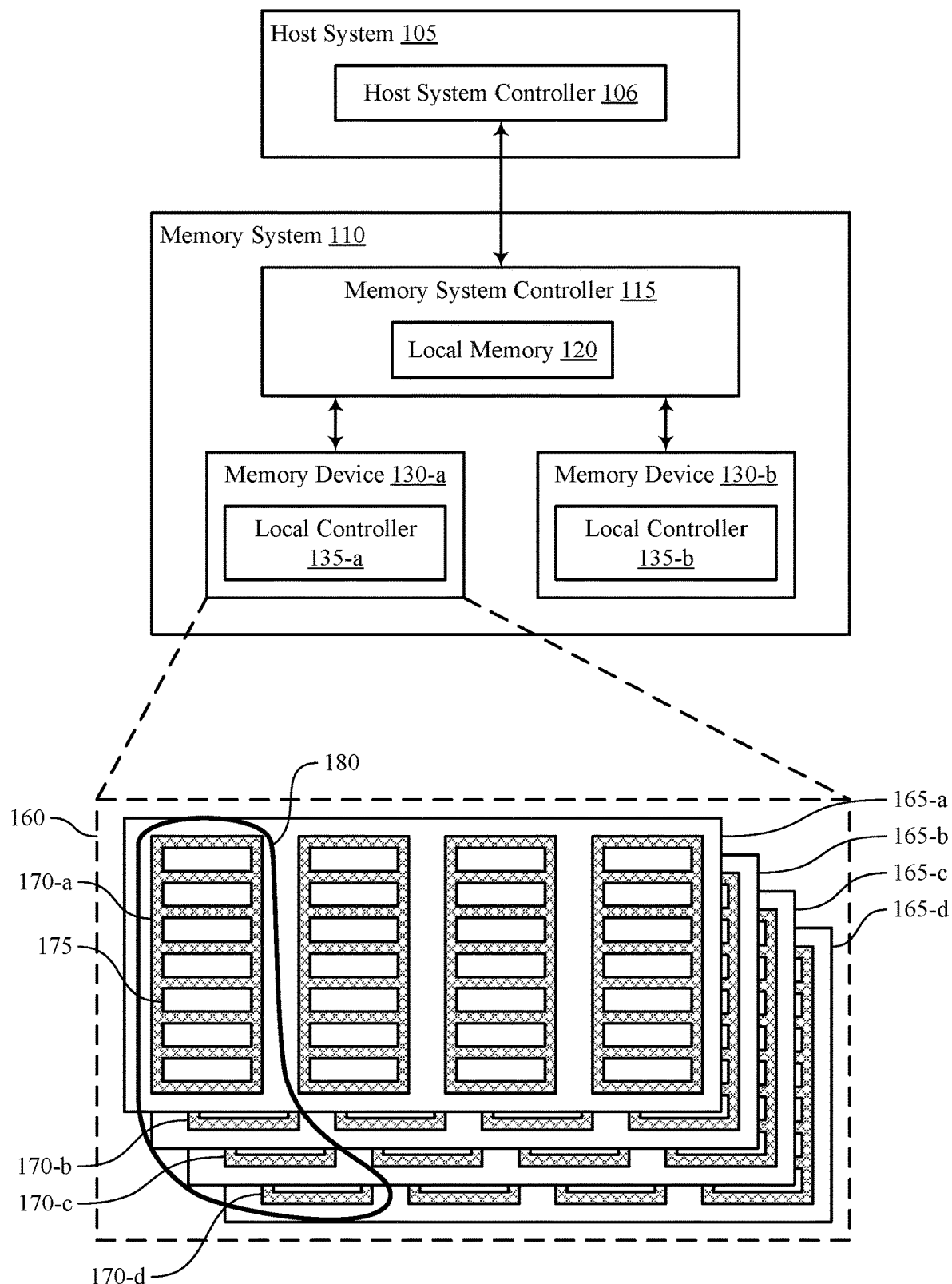
FIG. 1 illustrates an example of a system that supports command and data path error protection in accordance with examples as disclosed herein.
Figure 2:
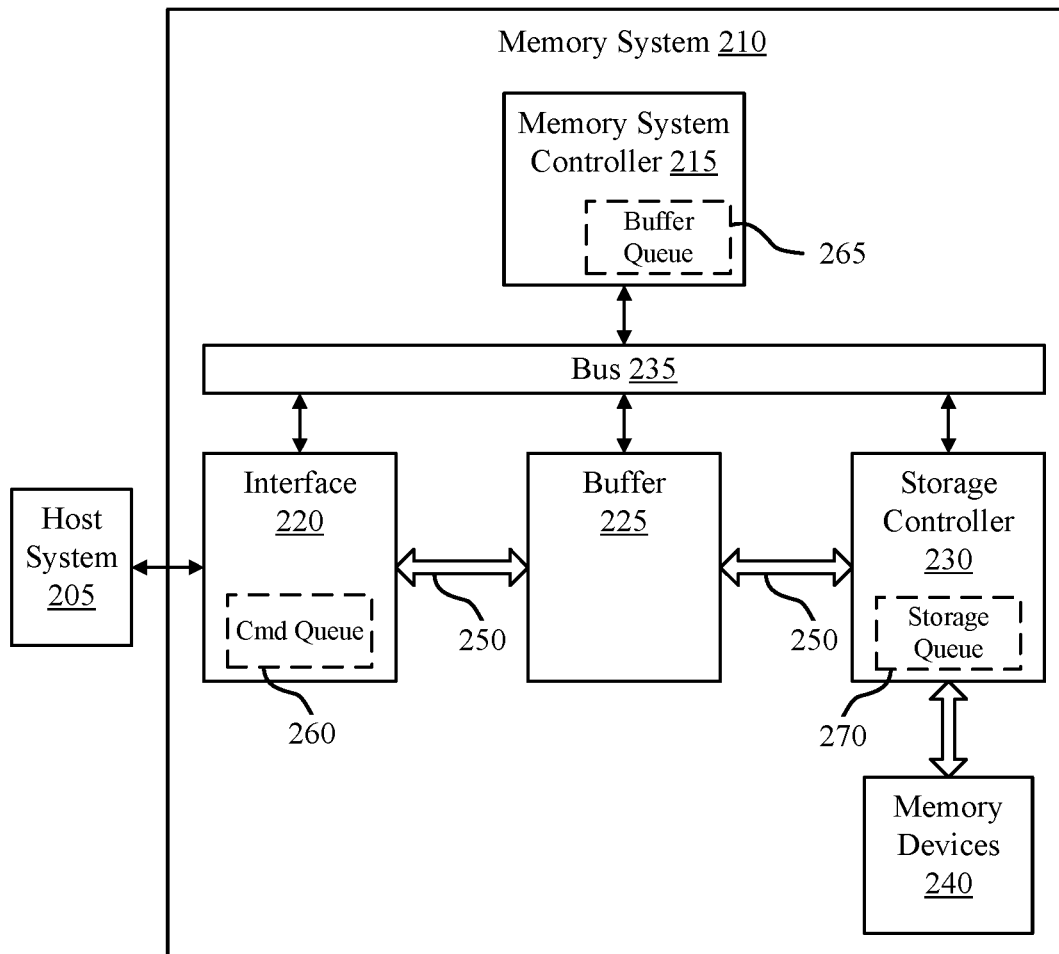
FIG. 2 illustrates an example of a system that supports command and data path error protection in accordance with examples as disclosed herein.

Features of the disclosure are initially described in the context of systems, devices, and circuits with reference to FIGS. 1 and 2. Features of the disclosure are described in the context of systems, layer diagrams, data units, and process flow diagrams with reference to FIGS. 3-6. These and other features of the disclosure are further illustrated by and described in the context of an apparatus diagram and flowchart that relate to command and data path error protection with reference to FIGS. 7-10.

FIG. 1 illustrates an example of a system 100 that supports command and data path error protection in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices and, in some cases, may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may, in some cases, be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-a and 130-b are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally or alternatively include static random access memory (SRAM) or other memory that may be used by the memory system controller 115 for internal storage or calculations, for example, related to the functions ascribed herein to the memory system controller 115. Additionally or alternatively, the local memory 120 may serve as a cache for the memory system controller 115. For example, data may be stored in the local memory 120 if read from or written to a memory device 130, and the data may be available within the local memory 120 for subsequent retrieval for or manipulation (e.g., updating) by the host system 105 (e.g., with reduced latency relative to a memory device 130) in accordance with a cache policy.

Although the example of the memory system 110 in FIG. 1 has been illustrated as including the memory system controller 115, in some cases, a memory system 110 may not include a memory system controller 115. For example, the memory system 110 may additionally or alternatively rely upon an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may, in some cases, be performed instead by the host system 105, a local controller 135, or any combination thereof. In some cases, a memory device 130 that is managed at least in part by a memory system controller 115 may be referred to as a managed memory device. An example of a managed memory device is a managed NAND (MNAND) device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (RAM) (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EEPROM), or any combination thereof. Additionally or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-a may include a local controller 135-a and a memory device 130-b may include a local controller 135-b.

In some cases, a memory device 130 may be or include a NAND device (e.g., NAND flash device). A memory device 130 may be or include a memory die 160. For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may take place within different planes 165. For example, concurrent operations may be performed on memory cells within different blocks 170 so long as the different blocks 170 are in different planes 165. In some cases, an individual block 170 may be referred to as a physical block, and a virtual block 180 may refer to a group of blocks 170 within which concurrent operations may occur. For example, concurrent operations may be performed on blocks 170-a, 170-b, 170-c, and 170-d that are within planes 165-a, 165-b, 165-c, and 165-d, respectively, and blocks 170-a, 170-b, 170-c, and 170-d may be collectively referred to as a virtual block 180. In some cases, a virtual block may include blocks 170 from different memory devices 130 (e.g., including blocks in one or more planes of memory device 130-a and memory device 130-b). In some cases, the blocks 170 within a virtual block may have the same block address within their respective planes 165 (e.g., block 170-a may be "block 0" of plane 165-a, block 170-b may be "block 0" of plane 165-b, and so on). In some cases, performing concurrent operations in different planes 165 may be subject to one or more restrictions, such as concurrent operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may, in some cases, not be updated until the entire block 170 that includes the page 175 has been erased.

The system 100 may include any quantity of non-transitory computer readable media that support command and data path error protection. For example, the host system 105, the memory system controller 115, or a memory device 130 (e.g., a local controller 135) may include or otherwise may access one or more non-transitory computer readable media storing instructions (e.g., firmware) for performing the functions ascribed herein to the host system 105, memory system controller 115, or memory device 130. For example, such instructions, if executed by the host system 105 (e.g., by the host system controller 106), by the memory system controller 115, or by a memory device 130 (e.g., by a local controller 135), may cause the host system 105, memory system controller 115, or memory device 130 to perform one or more associated functions as described herein.

In some cases, a memory system 110 may utilize a memory system controller 115 to provide a managed memory system that may include, for example, one or more memory arrays and related circuitry combined with a local (e.g., on-die or in-package) controller (e.g., local controller 135). An example of a managed memory system is a managed NAND (MNAND) system.

In some examples, the memory system controller 115 may receive data units from the host system 105. Each data unit may include a set of fields and a set of parity bits associated with the set of fields. For example, the memory system controller 115 may receive a first data unit that includes a first set of fields and a first set of parity bits associated with the first set of fields, and a second data unit that a second set of fields and a second set of parity bits associated with the second set of fields. The first and second sets of parity bits may have been generated using a first error detecting code, such as a cyclic redundancy check (CRC) code.

Upon receiving the data units, the memory system controller 115 may perform an error detection operation by generating respective sets of parity bits to compare with the first set of parity bits and the second set of parity bits. For example, the memory system controller 115 may generate a first set of check bits using the first set of fields, and may compare the first set of check bits with the first set of parity bits. The memory system controller 115 may also generate a second set of check bits using the second set of fields, and may compare the second set of check bits with the second set of parity bits.

If no errors are detected, the memory system controller 115 may generate a protocol unit (e.g., a UPIU) using first data from a subset of the first set of fields and second data from a subset of the second set of fields. That is, the memory system controller 115 may remove (e.g., strip) some data from the respective sets of data units that is not required for storing associated data to a memory device 130. The memory system controller 115 may generate respective sets of parity bits (e.g., a third set of parity bits, a fourth set of parity bits) using the first data and the second data.

The memory system controller 115 may communicate the protocol unit and respective sets of parity bits to a local controller 135 (or another controller of the memory system 110 that is not shown). For example, the memory system controller 115 may communicate the protocol unit (e.g., including the respective sets of parity bits) to the local controller 135-a. The local controller 135-a may perform an error detection operation by generating respective sets of check bits to compare with the respective sets of parity bits. For example, the local controller 135-a may generate a third set of check bits and a fourth set of check bits from the first data and the second data of the protocol unit and compare the third set of check bits with the third set of parity bits and the fourth set of check bits with the fourth set of parity bits. If no errors are detected, the local controller 135-a may process the protocol unit to obtain a data storage unit.

The data storage unit may include the first data and the second data. The data storage unit may be exclusive of other data of the protocol unit. The local memory controller 135-a may generate a set of parity bits (e.g., a fifth set of parity bits) using the first data and the second data. The fifth set of parity bits may be generated from the first data and the second data jointly (e.g., from joint data word including the first data and the second data). The first data, the second data, and the fifth set of parity bits may be written to the one or more memory cells of the memory device 130-a. By generating parity bits (and performing error detection operations) associated with the protocol unit and data storage unit, errors that occur along the data path of the memory system 110 may be detected, which may improve its overall performance and reliability.

FIG. 2 illustrates an example of a system 200 that supports command and data path error protection in accordance with examples as disclosed herein. The system 200 may be an example of a system 100 as described with reference to FIG. 1 or aspects thereof. The system 200 may include a memory system 210 configured to store data received from the host system 205 and to send data to the host system 205, if requested by the host system 205 using access commands (e.g., read commands or write commands). The system 200 may implement aspects of the system 100 as described with reference to FIG. 1. For example, the memory system 210 and the host system 205 may be examples of the memory system 110 and the host system 105, respectively.

The memory system 210 may include memory devices 240 to store data transferred between the memory system 210 and the host system 205, e.g., in response to receiving access commands from the host system 205, as described herein. The memory devices 240 may include one or more memory devices as described with reference to FIG. 1. For example, the memory devices 240 may include NAND memory, PCM, self-selecting memory, 3D cross point, other chalcogenide-based memories, FERAM, MRAM, NOR (e.g., NOR flash) memory, STT-MRAM, CBRAM, RRAM, or OxRAM.

The memory system 210 may include a storage controller 230 for controlling the passing of data directly to and from the memory devices 240, e.g., for storing data, retrieving data, and determining memory locations in which to store data and from which to retrieve data. The storage controller 230 may communicate with memory devices 240 directly or via a bus (not shown) using a protocol specific to each type of memory device 240. In some cases, a single storage controller 230 may be used to control multiple memory devices 240 of the same or different types. In some cases, the memory system 210 may include multiple storage controllers 230, e.g., a different storage controller 230 for each type of memory device 240. In some cases, a storage controller 230 may implement aspects of a local controller 135 as described with reference to FIG. 1.

The memory system 210 may additionally include an interface 220 for communication with the host system 205 and a buffer 225 for temporary storage of data being transferred between the host system 205 and the memory devices 240. The interface 220, buffer 225, and storage controller 230 may be for translating data between the host system 205 and the memory devices 240, e.g., as shown by a data path 250, and may be collectively referred to as data path components.

Using the buffer 225 to temporarily store data during transfers may allow data to be buffered as commands are being processed, thereby reducing latency between commands and allowing arbitrary data sizes associated with commands. This may also allow bursts of commands to be handled, and the buffered data may be stored or transmitted (or both) once a burst has stopped. The buffer 225 may include relatively fast memory (e.g., some types of volatile memory, such as SRAM or DRAM) or hardware accelerators or both to allow fast storage and retrieval of data to and from the buffer 225. The buffer 225 may include data path switching components for bi-directional data transfer between the buffer 225 and other components.

The temporary storage of data within a buffer 225 may refer to the storage of data in the buffer 225 during the execution of access commands. That is, upon completion of an access command, the associated data may no longer be maintained in the buffer 225 (e.g., may be overwritten with data for additional access commands). In addition, the buffer 225 may be a non-cache buffer. That is, data may not be read directly from the buffer 225 by the host system 205. For example, read commands may be added to a queue without an operation to match the address to addresses already in the buffer 225 (e.g., without a cache address match or lookup operation).

The memory system 210 may additionally include a memory system controller 215 for executing the commands received from the host system 205 and controlling the data path components in the moving of the data. The memory system controller 215 may be an example of the memory system controller 115 as described with reference to FIG. 1. A bus 235 may be used to communicate between the system components.

In some cases, one or more queues (e.g., a command queue 260, a buffer queue 265, and a storage queue 270) may be used to control the processing of the access commands and the movement of the corresponding data. This may be beneficial, e.g., if more than one access command from the host system 205 is processed concurrently by the memory system 210. The command queue 260, buffer queue 265, and storage queue 270 are depicted at the interface 220, memory system controller 215, and storage controller 230, respectively, as examples of a possible implementation. However, queues, if used, may be positioned anywhere within the memory system 210.

Data transferred between the host system 205 and the memory devices 240 may take a different path in the memory system 210 than non-data information (e.g., commands, status information). For example, the system components in the memory system 210 may communicate with each other using a bus 235, while the data may use the data path 250 through the data path components instead of the bus 235. The memory system controller 215 may control how and if data is transferred between the host system 205 and the memory devices 240 by communicating with the data path components over the bus 235 (e.g., using a protocol specific to the memory system 210).

If a host system 205 transmits access commands to the memory system 210, the commands may be received by the interface 220, e.g., according to a protocol (e.g., a UFS protocol or an eMMC protocol). Thus, the interface 220 may be considered a front end of the memory system 210. Upon receipt of each access command, the interface 220 may communicate the command to the memory system controller 215, e.g., via the bus 235. In some cases, each command may be added to a command queue 260 by the interface 220 to communicate the command to the memory system controller 215.

The memory system controller 215 may determine that an access command has been received based on the communication from the interface 220. In some cases, the memory system controller 215 may determine the access command has been received by retrieving the command from the command queue 260. The command may be removed from the command queue 260 after it has been retrieved therefrom, e.g., by the memory system controller 215. In some cases, the memory system controller 215 may cause the interface 220, e.g., via the bus 235, to remove the command from the command queue 260.

Upon the determination that an access command has been received, the memory system controller 215 may execute the access command. For a read command, this may mean obtaining data from the memory devices 240 and transmitting the data to the host system 205. For a write command, this may mean receiving data from the host system 205 and moving the data to the memory devices 240.

In either case, the memory system controller 215 may use the buffer 225 for, among other things, temporary storage of the data being received from or sent to the host system 205. The buffer 225 may be considered a middle end of the memory system 210. In some cases, buffer address management (e.g., pointers to address locations in the buffer 225) may be performed by hardware (e.g., dedicated circuits) in the interface 220, buffer 225, or storage controller 230.

To process a write command received from the host system 205, the memory system controller 215 may first determine if the buffer 225 has sufficient available space to store the data associated with the command. For example, the memory system controller 215 may determine, e.g., via firmware (e.g., controller firmware), an amount of space within the buffer 225 that may be available to store data associated with the write command.

In some cases, a buffer queue 265 may be used to control a flow of commands associated with data stored in the buffer 225, including write commands. The buffer queue 265 may include the access commands associated with data currently stored in the buffer 225. In some cases, the commands in the command queue 260 may be moved to the buffer queue 265 by the memory system controller 215 and may remain in the buffer queue 265 while the associated data is stored in the buffer 225. In some cases, each command in the buffer queue 265 may be associated with an address at the buffer 225. That is, pointers may be maintained that indicate where in the buffer 225 the data associated with each command is stored. Using the buffer queue 265, multiple access commands may be received sequentially from the host system 205 and at least portions of the access commands may be processed concurrently.

If the buffer 225 has sufficient space to store the write data, the memory system controller 215 may cause the interface 220 to transmit an indication of availability to the host system 205 (e.g., a "ready to transfer" indication), e.g., according to a protocol (e.g., a UFS protocol or an eMMC protocol). As the interface 220 subsequently receives from the host system 205 the data associated with the write command, the interface 220 may transfer the data to the buffer 225 for temporary storage using the data path 250. In some cases, the interface 220 may obtain from the buffer 225 or buffer queue 265 the location within the buffer 225 to store the data. The interface 220 may indicate to the memory system controller 215, e.g., via the bus 235, if the data transfer to the buffer 225 has been completed.

Once the write data has been stored in the buffer 225 by the interface 220, the data may be transferred out of the buffer 225 and stored in a memory device 240. This may be done using the storage controller 230. For example, the memory system controller 215 may cause the storage controller 230 to retrieve the data out of the buffer 225 using the data path 250 and transfer the data to a memory device 240. The storage controller 230 may be considered a back end of the memory system 210. The storage controller 230 may indicate to the memory system controller 215, e.g., via the bus 235, that the data transfer to a memory device of the memory devices 240 has been completed.

In some cases, a storage queue 270 may be used to aid with the transfer of write data. For example, the memory system controller 215 may push (e.g., via the bus 235) write commands from the buffer queue 265 to the storage queue 270 for processing. The storage queue 270 may include entries for each access command. In some examples, the storage queue 270 may additionally include a buffer pointer (e.g., an address) that may indicate where in the buffer 225 the data associated with the command is stored and a storage pointer (e.g., an address) that may indicate the location in the memory devices 240 associated with the data. In some cases, the storage controller 230 may obtain from the buffer 225, buffer queue 265, or storage queue 270 the location within the buffer 225 from which to obtain the data. The storage controller 230 may manage the locations within the memory devices 240 to store the data (e.g., performing wear-leveling, garbage collection, and the like). The entries may be added to the storage queue 270, e.g., by the memory system controller 215. The entries may be removed from the storage queue 270, e.g., by the storage controller 230 or memory system controller 215 upon completion of the transfer of the data.

To process a read command received from the host system 205, the memory system controller 215 may again first determine if the buffer 225 has sufficient available space to store the data associated with the command. For example, the memory system controller 215 may determine, e.g., via firmware (e.g., controller firmware), an amount of space within the buffer 225 that may be available to store data associated with the read command.

In some cases, the buffer queue 265 may be used to aid with buffer storage of data associated with read commands in a similar manner as discussed above with respect to write commands. For example, if the buffer 225 has sufficient space to store the read data, the memory system controller 215 may cause the storage controller 230 to retrieve the data associated with the read command from a memory device 240 and store the data in the buffer 225 for temporary storage using the data path 250. The storage controller 230 may indicate to the memory system controller 215, e.g., via the bus 235, when the data transfer to the buffer 225 has been completed.

In some cases, the storage queue 270 may be used to aid with the transfer of read data. For example, the memory system controller 215 may push the read command to the storage queue 270 for processing. In some cases, the storage controller 230 may obtain from the buffer 225 or storage queue 270 the location within the memory devices 240 from which to retrieve the data. In some cases, the storage controller 230 may obtain from the buffer queue 265 the location within the buffer 225 to store the data. In some cases, the storage controller 230 may obtain from the storage queue 270 the location within the buffer 225 to store the data. In some cases, the memory system controller 215 may move the command processed by the storage queue 270 back to the command queue 260.

Once the data has been stored in the buffer 225 by the storage controller 230, the data may be transferred out of the buffer 225 and sent to the host system 205. For example, the memory system controller 215 may cause the interface 220 to retrieve the data out of the buffer 225 using the data path 250 and transmit the data to the host system 205, e.g., according to a protocol (e.g., a UFS protocol or an eMNIC protocol). For example, the interface 220 may process the command from the command queue 260 and may indicate to the memory system controller 215, e.g., via the bus 235, that the data transmission to the host system 205 has been completed.

The memory system controller 215 may execute received commands according to an order (e.g., a first-in, first-out order, according to the order of the command queue 260). For each command, the memory system controller 215 may cause data corresponding to the command to be moved into and out of the buffer 225, as discussed above. As the data is moved into and stored within the buffer 225, the command may remain in the buffer queue 265. A command may be removed from the buffer queue 265, e.g., by the memory system controller 215, if the processing of the command has been completed (e.g., if data corresponding to the access command has been transferred out of the buffer 225). If a command is removed from the buffer queue 265, the address previously storing the data associated with that command may be available to store data associated with a new command.

The memory system controller 215 may additionally be configured for operations associated with the memory devices 240. For example, the memory system controller 215 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., LBAs) associated with commands from the host system 205 and physical addresses (e.g., physical block addresses) associated with memory cells within the memory devices 240. That is, the host system 205 may issue commands indicating one or more LBAs and the memory system controller 215 may identify one or more physical block addresses indicated by the LBAs. In some cases, one or more contiguous LBAs may correspond to noncontiguous physical block addresses. In some cases, the storage controller 230 may be configured to perform one or more of the above operations in conjunction with or instead of the memory system controller 215. In some cases, the memory system controller 215 may perform the functions of the storage controller 230 and the storage controller 230 may be omitted.

In some examples, the interface 220 may receive data units from the host system 205. Each data unit may include a set of fields and a set of parity bits associated with the set of fields. For example, the interface 220 may receive a first data unit that includes a first set of fields and a first set of parity bits associated with the first set of fields, and a second data unit that a second set of fields and a second set of parity bits associated with the second set of fields. The first and second sets of parity bits may have been generated using a first error detecting code, such as a cyclic redundancy check (CRC) code.

Upon receiving the data units, the memory system controller 215 may perform an error detection operation by generating respective sets of parity bits to compare with the first set of parity bits and the second set of parity bits. For example, the memory system controller 215 may generate a first set of check bits using the first set of fields, and may compare the first set of check bits with the first set of parity bits. The memory system controller 215 may also generate a second set of check bits using the second set of fields, and may compare the second set of check bits with the second set of parity bits.

If no errors are detected, the memory system controller 215 may generate a protocol unit (e.g., a UPIU) using first data from a subset of the first set of fields and second data from a subset of the second set of fields. That is, the memory system controller 215 may remove (e.g., strip) some data from the respective sets of data units that is not required for storing associated data to a memory device 240. The memory system controller 215 may generate respective sets of parity bits (e.g., a third set of parity bits, a fourth set of parity bits) using the first data and the second data.

The memory system controller 215 may communicate the protocol unit and respective sets of parity bits to a storage controller 230 (or another controller of the memory system 210 that is not shown). The storage controller 230 may perform an error detection operation by generating respective sets of check bits to compare with the respective sets of parity bits. For example, the storage controller 230 may generate a third set of check bits and a fourth set of check bits from the first data and the second data of the protocol unit and compare the third set of check bits with the third set of parity bits and the fourth set of check bits with the fourth set of parity bits. If no errors are detected, the storage controller 230 may process the protocol unit to obtain a data storage unit.

The data storage unit may include the first data and the second data. The data storage unit may be exclusive of other data of the protocol unit. The storage controller 230 may generate a set of parity bits (e.g., a fifth set of parity bits) using the first data and the second data. The fifth set of parity bits may be generated from the first data and the second data jointly (e.g., from joint data word including the first data and the second data). The first data, the second data, and the fifth set of parity bits may be written to the one or more memory cells of the memory device 240. By generating parity bits (and performing error detection operations) associated with the protocol unit and data storage unit, errors that occur along the data path of the memory system 210 may be detected, which may improve its overall performance and reliability.

Figure 3:
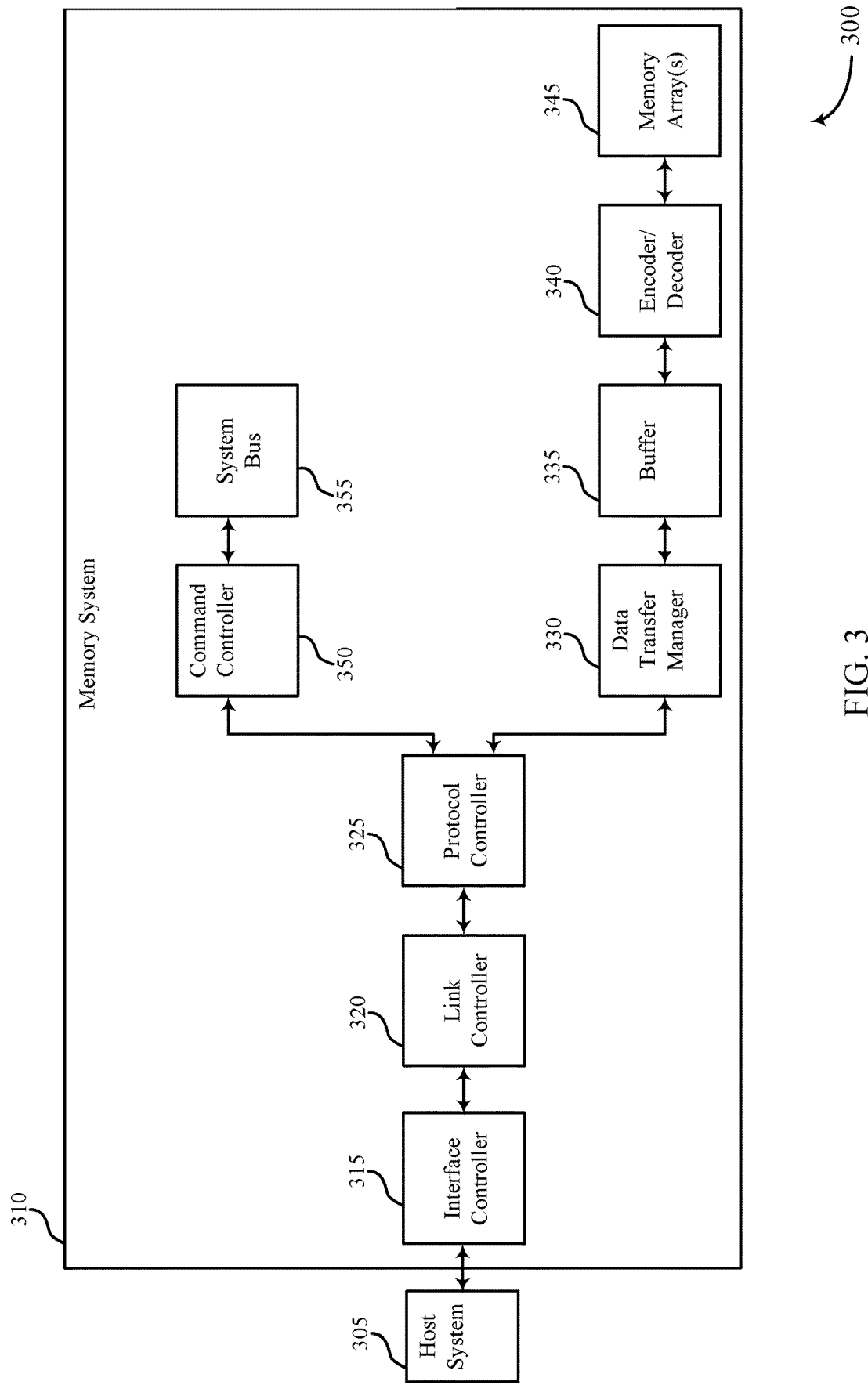
FIG. 3 illustrates an example of a system that supports command and data path error protection in accordance with examples as disclosed herein.

FIG. 3 illustrates an example of a system 300 that supports command and data path error protection in accordance with examples as disclosed herein. In some examples, the system 300 may include a host system 305 and a memory system 310. The host system 305 and the memory system 310 may be examples of the host system 205 and the memory system 210, respectively, as described with reference to FIG. 2. The memory system 310 may include an interface controller 315, a link controller 320, and a protocol controller 325. The memory system 310 may also include a data transfer manager (DTM) 330, a buffer 335, an encoder/decoder block 340, and one or more memory arrays 345, which may be utilized when processing data. Additionally or alternatively, the memory system 310 may include a controller 350 (e.g., a general-purpose command controller 350) and a system bus 355 which may be utilized when processing control information. The components of the memory system 310 may be configured to generate parity bits and perform error detection and correction operations associated with data paths of the memory system 310. By detecting and correcting errors that occur along the data paths of the memory system 310, the overall performance and reliability of the memory system 310 may be improved.

The host system 305 may communicate with the memory system 310. For example, the host system 305 may transmit packets that include one or more payloads. In some instances, the payloads may include or may be part of commands (e.g., read commands, write commands, other commands). The packets may be received by the interface controller 315 and commands included in the packets may be processed by the protocol controller 325

In some examples, the host system 305 may communicate the packets to the interface controller 315, which may utilize a UniPro® protocol stack and may include a physical interface that includes one or more serial data lanes. As described herein, the interface controller 315 may be configured to generate protocol units (e.g., upon receiving a write command from the host system 305) and data units (e.g., upon receiving a read command from the host system 305) for communicating to the link controller 320 and the host system 305, respectively.

The memory system 310 may include a link controller 320 that is coupled with the interface controller 315. In some instances, the link controller 320 may be referred to as a Universal Flash Storage (UFS) link controller 320, and may operate according to a UFS protocol. The link controller 320 may receive protocol units from the interface controller 315, in the instance of a write operation, and may communicate the protocol units to the protocol controller 325. In the instance of read operations, the link controller 320 may receive protocol units from the protocol controller 325 and may communicate the protocol units to the interface controller 315.

In some examples, the memory system 310 may include a protocol controller 325 that is coupled with the link controller 320. The protocol controller 325 may operate according to a UFS protocol and may receive protocol units from the link controller 320 (e.g., during a write operation). As described herein, the interface controller 315 may utilize a UniPro® protocol stack. However, upon receiving a command (e.g., a read command) and performing certain operations on fields of the command to generate a protocol unit, the protocol unit may be communicated to the protocol controller 325 using signaling that is the same as or resembles UFS signaling. When the protocol controller 325 receives the protocol unit, it can either communicate the protocol unit to the DTM 330 if the protocol unit is associated with data or to the command controller 350 if the protocol unit is associated with control information.

The DTM 330 may receive and process the protocol unit. In some examples, the DTM 330 may process the protocol unit to obtain a data storage unit, which may be written to a memory array 345. Before the data storage unit is written to a memory array 345, the data storage unit may be communicated from the DTM 330 to a buffer 335 and then to the encoder/decoder block 340. During a write operation, the data storage unit may be encoded, which may add error correction capabilities to the data storage unit before being written to the memory array 345.

Additionally or alternatively, the protocol controller 325 may communicate a protocol unit associated with control information to the command controller 350. As used herein, the term control information may refer to any information associated with a command received from the host system 305 other than data to be read from or written to a memory array 345. In some examples, the protocol unit comprising the control information may be processed by the command controller 350 and may be communicated to a system bus 355. The system bus 355 may communicate the control information to a portion or component of the memory system 310 associated with the control information. The system bus 355 may be an example of the bus 235 of FIG. 2.

As described herein, the components of the memory system 310 may be configured to perform error detection operations to identify errors that occur in various data paths. For example, the interface controller 315 may receive data units from the host system 305 that include respective sets of parity bits. The parity bits may have been generated using a CRC error-detecting code. The interface controller 315 may, upon receiving the data units and parity bits, generate additional sets of parity bits (e.g., check bits) for comparison with the received parity bits. Generating sets of parity bits to compare with CRC parity bits received in data units from the host system 305 may ultimately allow the memory system 310 to identify whether errors occur between the host system 305 and the memory system 310. Additionally or alternatively, the sets of parity bits and corresponding parity check bits generated by the memory system 310 may allow the memory system 310 to identify errors that occur internally (e.g., within the data paths of the memory system 310), which may improve the overall performance and reliability of the memory system 310.

In some examples, the host system 305 may transmit one or more data units to the memory system 310 that are associated with write commands. For example, the host system 305 may transmit one or more data units associated with a command (e.g., a write command) and one or more data units associated with corresponding data. Thus as used herein, a "first write command" and a "second write command" may each refer to one or more data units associated with a write command and one or more corresponding data units that includes the associated data. In some examples, the host system 305 may transmit data packets associated with the first write command and the second write command to the memory system 310. The first write command may be associated with at least a first data unit that includes a first set of fields and a first set of parity bits associated with the first set of fields and the second write command may be associated with at least a second data unit that includes a second set of fields and a second set of parity bits associated with the second set of fields. In some examples, the first set of parity bits and the second set of parity bits may have been generated using a CRC error-detection code.

Upon receiving the first write command and the second write command, the interface controller 315 may perform an error detection operation. For example, the interface controller 315 may generate a first set of check bits (e.g., an eighth set of parity bits) using the first data unit and a second set of check bits (e.g., a ninth set of parity bits) using the second data unit. The generated check bits may then be compared with the parity bits received in the respective data units (e.g., the first set of parity bits may be compared with the first set of check bits and the second set of parity bits may be compared with the second set of check bits). If the compared bits do not match, then an error may have occurred and the interface controller 315 may generate signaling to transmit to the host system 305. For example, the signaling may request that the host system 305 retransmit the data. If the compared bits match, the interface controller 315 may generate a protocol unit (e.g., a UPIU) using the first data unit and the second data unit.

To generate the UPIU, the interface controller 315 may selectively remove some data (e.g., some fields) from the first data unit and the second data unit. For example, some fields that do not include payload data or identify a destination location for the data may not be included in the protocol unit (such as the first and second sets of parity bits). Accordingly, the protocol unit may include first data from a subset of the first set of fields and second data from a subset of the second set of fields. Additionally or alternatively, the interface controller 315 may generate parity bits associated with the data from the subsets of the sets of fields. For example, the interface controller 315 may generate a third set of parity bits using first data (e.g., a subset of data from the first data unit) and a fourth set of parity bits using second data (e.g., a subset of data from the second data unit). In some examples, the third set of parity bits may be sent as byte parity with the first data. Additionally or alternatively, the UPIU may be transmitted via a bus having a width of 64 or 128 bits, meaning that a UPIU transmitted via bus having a width of 64 bits may include 64 bits of data and 8 bits of byte parity transmitted per clock cycle. As described herein, the third and fourth sets of parity bits may be used for identifying errors in one or more data paths of the memory system 310.

Upon generating the protocol unit, the interface controller 315 may transmit the protocol unit to the link controller 320, and the link controller 320 may transmit the protocol unit to the protocol controller 325. As described herein, the protocol controller 325 may determine that the protocol unit is associated with data to be written to a memory array 345, and may transmit the protocol unit to the DTM 330.

Upon receiving the protocol unit, the DTM 330 may perform an error detection operation. For example, the DTM 330 may generate a third set of check bits (e.g., a sixth set of parity bits) using the first data and a fourth set of check bits (e.g., a seventh set of parity bits) using the second data. The generated check bits may then be compared with the parity bits received in the protocol unit (e.g., the third set of parity bits may be compared with the third set of check bits and the fourth set of parity bits may be compared with the fourth set of check bits). If the compared bits do not match, then an error may have occurred in a data path between the interface controller 315 and the DTM 330. In such instances, signaling may generated that indicates (e.g., to the interface controller 315) negatively acknowledge (e.g., NACK) the associated data units.

If the compared bits match, the DTM 330 may process the protocol unit to obtain a data storage unit. To generate the data storage unit, the DTM 330 may selectively remove some data (e.g., some fields) from the protocol unit. For example, some fields that do not include payload data or identify a destination location for the data may not be included in the data storage unit (such as the third and fourth sets of parity bits). Thus, the data storage unit may include the first data and the second data, which are to be written to a memory array 345. In some examples, the DTM 330 may also generate a fifth set of parity bits that are generated using both the first data and the second data. The fifth set of parity bits, which may be referred to as end-to-end CRC bits, may be stored to a portion of a memory array 345 and may be used as part of an error detection operation when reading the associated data from the memory array 345.

After generating the data storage unit, the DTM 330 may transmit the data storage unit to the buffer 335, which may transmit the data storage unit to the encoder/decoder block 340. As described herein, the data storage unit may be encoded (e.g., before being written to a memory array 345) for error correction purposes. After encoding, the data storage unit (e.g., the first data, the second data, and the fifth set of parity bits) may be written to the memory array 345.

In other examples, commands received by the interface controller 315 that include control information may be processed similarly. However, instead of transmitting a protocol unit (e.g., a second protocol unit) to the DTM 330, the protocol controller 325 may transmit the second protocol unit to the command controller 350. The command controller 350 may then process the second protocol unit and transmit the resulting control unit to the system bus 355. For example, as described with reference to FIG. 2, the second protocol unit may be stored to the buffer 225 and the command controller 350 (e.g., the storage controller 230) may determine how to perform operations on protocol units stored to the buffer 225 in order to store the associated data to the memory devices 240.

In some examples, the host system 305 may transmit read commands to the memory system 310. For example, the host system 305 may transmit a first read command, for data stored to a memory array 345, to the memory system 310. Upon receiving the first read command, the DTM 330 may read an associated data storage unit from the associated memory array 345. The data storage unit may include first data and a first set of parity bits associated with the first data. In some examples, the data storage unit may first be decoded by the encoder/decoder block 340 and may be communicated to the DTM 330 via the buffer 335.

Upon receiving the data storage unit, the DTM 330 may perform an error detection operation. For example, the DTM 330 may generate a first set of check bits (e.g., a sixth set of parity bits) using the first data. The generated parity bits may then be compared with the first set of parity bits included in the data storage unit (e.g., the first set of parity bits may be compared with the first set of check bits). If the compared bits do not match, then an error may have occurred when reading the data from the memory array 345 (or when the data was written to the memory array 345). If the compared bits match, the DTM 330 may process the data storage unit to obtain a protocol unit (e.g., a protocol unit).

To generate the protocol unit, the DTM 330 may separate the first data into different fields. For example, the protocol unit may include a first field including a first portion of the first data and a second field including a second portion of the first data. The protocol unit may also include a second set of parity bits and a third set of parity bits that were each generated by the DTM 330. In some examples, the second set of parity bits may have been generated using the first portion of the first data and the third set of parity bits may have been generated using the second portion of the first data. In some examples, the second set of parity bits and third set of parity bits may be generated as byte parity with the first data. Additionally or alternatively, the UPIU may be transmitted via a bus having a width of 64 or 128 bits, meaning that a UPIU transmitted via bus having a width of 64 bits may include 64 bits of data and 8 bits of byte parity transmitted per clock cycle. Additionally or alternatively, the protocol unit may not include the first set of parity bits, which may have been removed upon the first set of parity bits matching the sixth set of parity bits.

After generating the protocol unit, the DTM 330 may transmit the protocol unit to the interface controller 315 (e.g., via the protocol controller 325 and the link controller 320). Upon receiving the protocol unit, the interface controller 315 may perform an error detection operation. For example, the interface controller 315 may generate a second set of check bits (e.g., a seventh set of parity bits) using the first portion of the first data and a third set of check bits (e.g., an eighth set of parity bits) using the second portion of the first data. The generated parity bits may then be compared with the second set of parity bits and the third set of parity bits (e.g., the second set of parity bits may be compared with the second set of check bits and the third set of parity bits may be compared with the third set of check bits). If the compared bits do not match, then an error may have occurred in a data path of the memory system 310. If the compared bits match, the interface controller 315 may process the protocol unit to generate a first data unit and a second data unit.

To generate the first data unit and the second data unit, the interface controller 315 may generate respective sets of fields and parity bits for transmitting to the host system 305. For example, the interface controller 315 may generate the first data unit that includes a first set of fields and a fourth set of parity bits. In some examples, a subset of the first set of fields includes the first portion of the first data. Additionally or alternatively, the second data unit may include a second set of fields and a fifth set of parity bits. A subset of the second set of fields may include the second portion of the first data. The first and second data units may be transmitted to the host system 305, which may use the fourth set of parity bits and the fifth set of parity bits as part of a CRC error-detecting operation.

In some examples, the interface controller 315 may have determined that an error occurred in a data path of the memory system 310. In such instances, the interface controller 315 may intentionally corrupt the fourth set of parity bits and/or the fifth set of parity bits before transmitting the first data unit and the second data unit to the host system 305. By corrupting one or more sets of the parity bits, the memory system 310 may notify the host system 305 that an error occurred during the read operation. Accordingly, by detecting and correcting errors that occur along the data paths of the memory system 310 as described herein, the overall performance and reliability of the memory system 310 may be improved.

Figure 4:
FIG. 4 illustrates an example of a layer diagram that supports command and data path error protection in accordance with examples as disclosed herein.

FIG. 4 illustrates an example of a layer diagram 400 that supports command and data path error protection in accordance with examples as disclosed herein. In some examples, the layer diagram 400 may illustrate a communication stack utilized by a memory system (e.g., a memory system 310 as described with reference to FIG. 3). The layer diagram 400 may illustrate a communication stack that includes application-specific protocols (LA) 405, a transport layer 410, a network layer 415, a data link layer 420, a physical (PHY) adaptor layer 425, and a PHY layer 430. The protocol stack may support the detection and correction of errors, by components of the memory system, that occur along data paths of the memory system, which may improve the overall performance and reliability of the memory system.

The layer diagram 400 may illustrate aspects of data flow in a memory system (e.g., a memory system 310 as described with reference to FIG. 3). In some examples, the layer diagram 400 may illustrate aspects of the communication functions performed by an interface controller (e.g., an interface controller 315 as described with reference to FIG. 3). For example, the interface controller may receive commands according to an application-specific protocol, such as a UFS protocol. The interface controller may manage the flow of data within the memory system according to the transport layer 410, network layer 415, data link layer 420, physical (PHY) adaptor layer 425, and PHY layer 430.

In some examples, the layer diagram 400 illustrates a transport layer 410 (e.g., Layer 4), which may be implemented by a memory system and may enable different devices (e.g., different components of the memory system) to share the network in a controlled manner. For example, the transport layer 410 may provide flow control functionality to provide a level of addressing within the memory system, which may allow the interface controller to connect and communicate with other devices, such as a link controller 320, a protocol controller, a data storage controller, and a command controller 350 as described with reference to FIG. 3. In some examples, data units associated with the transport layer 410 may be referred to as segments.

The layer diagram 400 also illustrates a network layer 415 (e.g., Layer 3), which may be implemented by a memory system and may be utilized for addressing to route data packets throughout the memory system. For example, the network layer 415 may be utilized to route data packets from the interface controller to a memory array (e.g., a memory array 345 as described with reference to FIG. 3). In some instances, a data packet may be routed to an address using a header that includes a destination address. Data units associated with the network layer 415 may be referred to as packets.

The layer diagram 400 illustrates a data link layer 420 (e.g., Layer 2), which may be implanted by a memory system and may allow for communications between adjacent nodes (e.g., components that are coupled together) in a memory system. For example, the data link layer 420 may communicate data frames that each include a start-of-data-frame field and an end-of-data-frame field. In other examples, the data link layer 420 may communicate control frames that each include a start-of-data-frame field and an end-of-data-frame field. A data frame or a control frame communicated by the data link layer 420 may also include a payload and one or more sets of parity bits as described herein. In some examples, data units associated with the data link layer 420 may be referred to as frames (e.g., data frames).

In some examples, the layer diagram 400 illustrates a PHY adaptor layer 425 (e.g., Layer 1.5) and a PHY layer 430 (e.g., Layer 1), which may be implanted by a memory system. The PHY layer 430 may allow for inter-chip (e.g., inter-memory-system) communication such as D-PHY and M-PHY. D-PHY signaling may communicate PHY symbols, clock signals, and signaling related to encoding or decoding operations. Additionally or alternatively, M-PHY signaling may support relatively higher-speed data rates and may utilize fewer signal wires because the clock signal is embedded with the data. Data units associated with the PHY layer 430 may be referred to as symbols (e.g., PHY symbols). Moreover, the PHY adaptor layer 425 may abstract (e.g., hide) any differences between D-PHY and M-PHY signaling, which may improve the overall flexibility of the memory system. Data units associated with the PHY adapter layer 425 may be referred to as UniPro symbols.

Figure 5A:
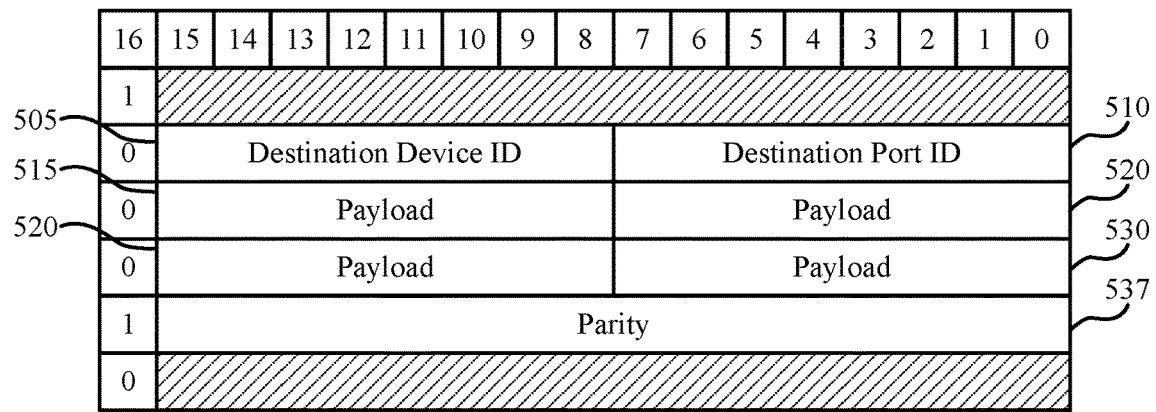
FIGS. 5A-5C illustrate examples of data units, protocol units, and data storage units that support command and data path error protection in accordance with examples as disclosed herein.

FIG. 5A illustrates an example of a data unit 500-a that supports command and data path error protection in accordance with examples as disclosed herein. In some examples, the data unit 500-a may be an example of a data unit that is transmitted from a host system (e.g., a host system 305 as described with reference to FIG. 3) and is received by an interface controller (e.g., an interface controller 315 as described with reference to FIG. 3) of a memory system (e.g., a memory system 310 as described with reference to FIG. 3). The data unit 500-a may include a destination device ID field 505, a destination port ID field 510, and payload fields 515, 520, 525, and 530. In some examples, the data unit 500-a may include other fields for addressing or other purposes.

In some examples, the data unit 500-a may include a destination device ID field 505 and a destination port ID field 510. The respective fields may be used for addressing and may be used when generating a protocol unit as described with reference to FIG. 5B. For example, the payload fields 515, 520, 525, and 530 may include data to be written to a memory array (e.g., a memory array 345 as described with reference to FIG. 3) and the particular memory array may be identified by the destination device ID field 505 and the destination port ID field 510.

The data unit 500-a may also include the payload fields 515, 520, 525, and 530. In some examples, each of the payload fields 515, 520, 525, and 530 may include data to be written to a memory array of the memory system or control information for the memory system. Additionally or alternatively, the data unit 500-a may include a set of parity bits 537 associated with the payload fields 515, 520, 525, and 530. As described herein, the parity bits may be used by the interface controller to determine whether the payload data includes any errors. In some examples the interface controller may, upon receiving the data unit 500-a and performing an error detection operation, generate a protocol unit (e.g., a UPIU) as described with reference to FIG. 5B.

Figure 5B:
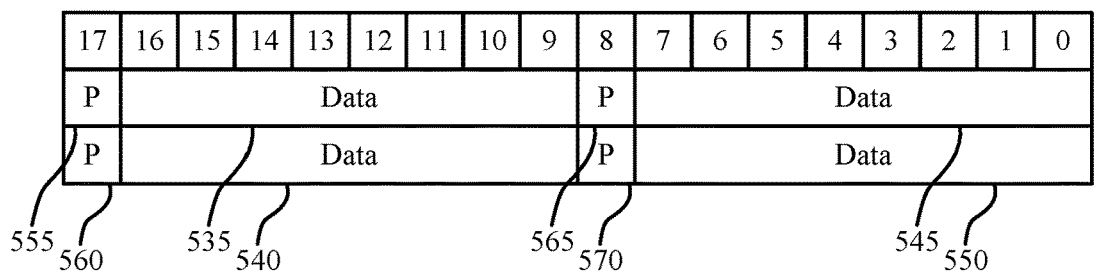

FIG. 5B illustrates an example of a protocol unit 500-b that supports command and data path error protection in accordance with examples as disclosed herein. In some examples, the protocol unit 500-b may be generated by an interface controller and may include data (e.g., payloads) from one or more data units. For example, the protocol unit 500-b may include first data 535, second data 540, third data 545, and fourth data 550 which may have been extracted from respective data units 500-a. Each byte of data may also be associated with a respective set of parity bits. For example, the first data 535 may be associated with a set of parity bits 555, which may be used to detect errors associated with a data path of the memory system. In some examples, each byte of data included in the protocol unit 500-b may be associated with a same destination ID (e.g., a same destination device ID field 505 as described with reference to FIG. 5A) and/or a same port ID (e.g., a same port device ID field 510 as described with reference to FIG. 5A).

In some examples, an interface controller of a memory system may process one or more data units to generate the protocol unit 500-b. For example, the interface controller may omit some fields from data units 500-a when generating a protocol unit 500-b. The interface controller may omit, for example, the destination device ID field 505 and the destination port ID field 510, among other fields. Thus, a protocol unit may include one or more sets of data and corresponding sets of parity bits.

For example, the protocol unit 500-b may include first data 535, second data 540, third data 545, and fourth data 550. Each byte of data may have been extracted from a respective data unit and may be associated with a same destination ID and/or a same port ID. For example, each byte of data may include data to be written to a same memory array of the memory system or may include control information associated with a same portion or aspect of the memory system. Accordingly, although not shown in FIG. 5B, multiple protocol units may be generated by the interface controller, and each protocol unit may be associated with a respective destination ID and/or port ID.

Additionally or alternatively, each byte of data (e.g., each of the first data 535, the second data 540, the third data 545, and the fourth data 550) may be associated with a respective set of parity bits (denoted P). For example, the first data 535 may be associated with a set of parity bits 555, the second data 540 may be associated with a set of parity bits 560, the third data 545 may be associated with a set of parity bits 565, and the fourth data 550 may be associated with a set of parity bits 570. The sets of parity bits may be used to detect errors in data paths of the memory system. Upon generating the protocol unit 500-b, the interface controller may transmit the protocol unit to a protocol controller (e.g., a protocol controller 325 as described with reference to FIG. 3), which may route the protocol unit based on whether it includes data or control information.

Figure 5C:
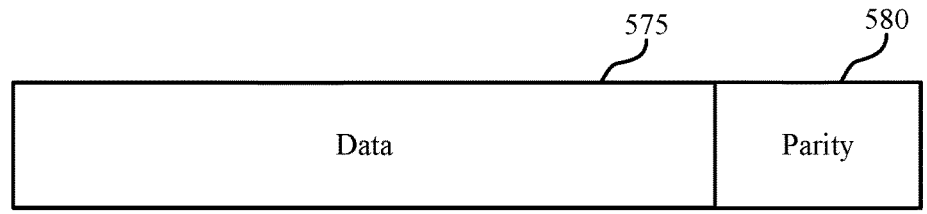

FIG. 5C illustrates an example of a data storage unit 500-c that supports command and data path error protection in accordance with examples as disclosed herein. In some examples, the data storage unit 500-c may be generated by a data storage controller and may include data from a protocol unit 500-b. For example, the data storage unit 500-c may include a data portion 575 (e.g., which may include the first data 535 and the second data 540 as described with reference to FIG. 5B). Moreover, the data storage unit 575 may be associated with the set of parity bits 580, which may be referred to as end-to-end CRC parity bits. In some examples, the data portion 575 and the set of parity bits 580 may be written to a memory array of the memory system.

In some examples, the data storage controller of the memory system may generate the data storage unit 500-c after performing an error detection operation using the parity bits included in the protocol unit 500-b. For example, the data storage controller may generate the data storage unit 500-c upon detecting that no errors existed in the data path between the interface controller and the data storage controller. Additionally or alternatively, the data storage controller may generate the set of parity bits 580 using a same or a different code than was used to generate the parity bits included in the protocol unit 500-b. The data storage controller may also generate a different quantity of parity bits than were generated and included in the protocol unit 500-b. By processing and generating the data units 500-a, protocol units 500-b, and data storage units 500-c as described herein with reference to FIG. 5A through 5C, a memory system may detect and correct errors that occur along its data paths, which may improve the overall performance and reliability of the memory system.

Figure 6A:
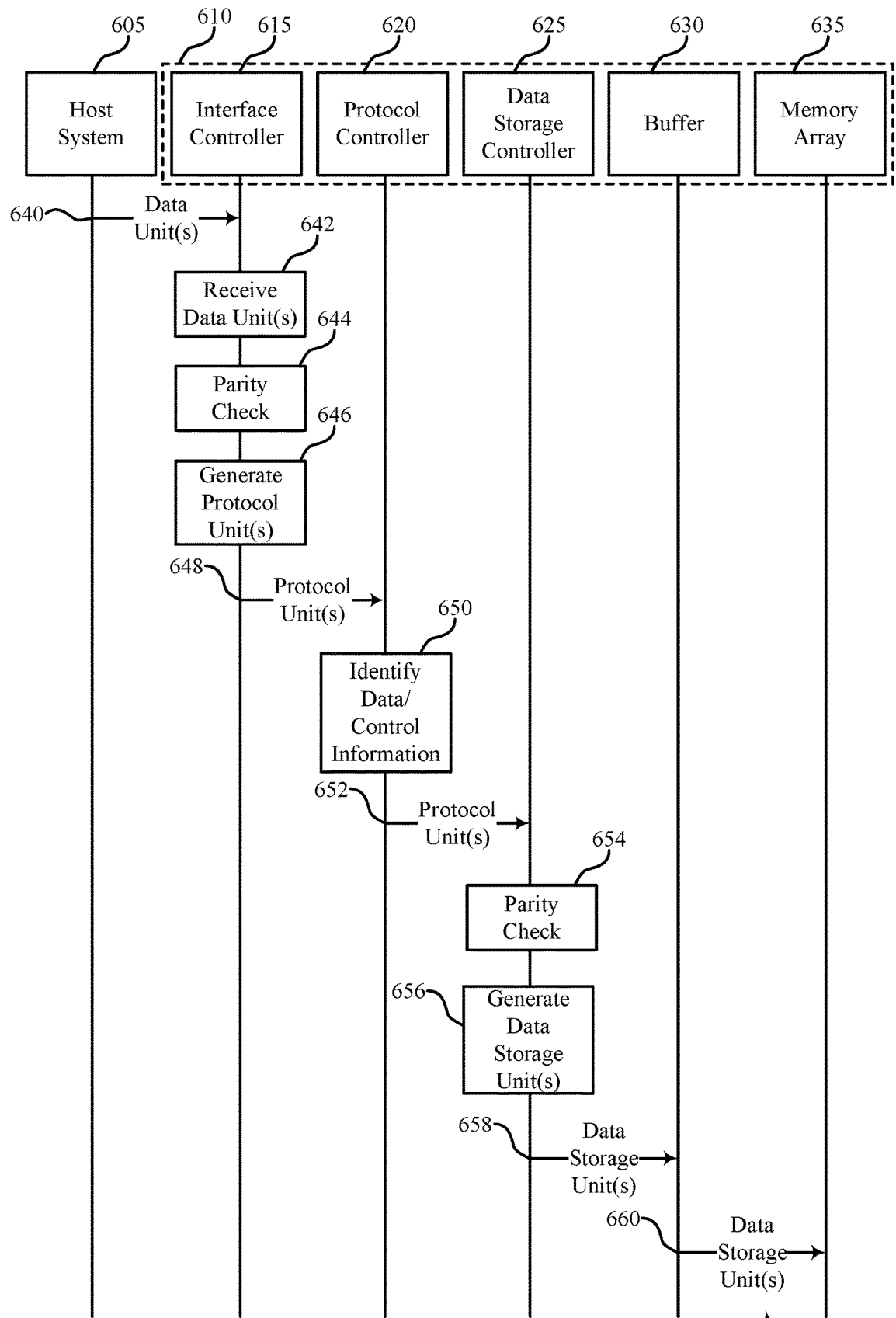
FIGS. 6A and 6B illustrate example process flow diagrams that support command and data path error protection in accordance with examples as disclosed herein.

FIG. 6A illustrates an example of a process flow diagram 600-a that supports command and data path error protection in accordance with examples as disclosed herein. In some examples, the process flow diagram 600-a may illustrate a write operation performed at a memory system 610. The memory system 610 may be coupled with a host system 605 and may include an interface controller 615, a protocol controller 620, a data storage controller 625, a buffer 630, and a memory array 635. In some examples, the interface controller 615, the protocol controller 620, the data storage controller 625, the buffer 630, and the memory array 635 may be examples of the interface controller 315, the protocol controller 325, the DTM 330, the buffer 335, and the memory array 345 as described with reference to FIG. 3. The memory system 610 may include other components, such as the components described with reference to FIG. 3, that are not shown. The process flow diagram 600-a may illustrate the processing and generation of data units, protocol units, and data storage units, which may allow for the detection of errors in data paths of the memory system 610, which may improve its overall performance and reliability.

At 640, the host system 605 may transmit one or more data units to the memory system 610. For example, the host system 605 may transmit a first data unit that includes a first set of fields (e.g., a first set of fields as described with reference to FIG. 5A) and a first set of parity bits associated with the first set of fields. The host system 605 may also transmit a second data unit that includes a second set of fields and a second set of parity bits associated with the first set of fields. The first and second sets of parity bits may be referred to as CRC parity bits. At 642, the interface controller 615 of the memory system 610 may receive the first data unit and the second data unit.

At 644, the interface controller 615 may perform a parity check on the first data unit and the second data unit. To perform the parity check, the interface controller 615 may generate respective sets of parity bits (e.g., check bits) associated with data of the first data unit and the second data unit. For example, the interface controller may generate a first set of check bits (e.g., an eight set of parity bits) using first data from the first data unit and a second set of check bits (e.g., a ninth set of parity bits) using second data from the second data unit. The interface controller 615 may compare the first set of parity bits with the first set of check bits and may compare the second set of parity bits with the second set of check bits. If the sets of parity bits do not match, then an error may have occurred when transmitting the data (e.g., the associated data units) from the host system 605 to the memory system. If the parity bits match, the interface controller 615 may generate a protocol unit associated with the first data unit and the second data unit.

At 646, the interface controller 615 may generate a protocol unit (e.g., a UPIU) using the first data unit and the second data unit. As described with reference to FIG. 5B, the protocol unit may include data that is associated with a same destination device ID and/or a same destination port ID. Thus, for exemplary purposes, it may be understood that the first data unit and the second data unit are associated with a same destination device ID and/or a same destination port ID and the associated first data and second data may be included in a same protocol unit.

Additionally or alternatively, the interface controller 615 may generate a third set of parity bits using the first data and a fourth set of parity bits using the second data and may include the respective sets of parity bits in the protocol unit. In some examples, the interface controller 615 may refrain from including some fields or some information in the protocol unit. For example, the interface controller 615 may refrain from including respective destination device ID or destination port ID fields in the protocol unit, and may also refrain from including the first set of parity bits and the second set of parity bits.

At 648, the interface controller 615 may transmit the protocol unit to the protocol controller 620. In some examples, the interface controller 615 may transmit the protocol unit to the protocol controller 620 via a link controller (e.g., a link controller 320 as described with reference to FIG. 3). At 650, the protocol controller 620 may identify whether the protocol unit includes data or control information. For exemplary purposes, the protocol unit may include data, however in some examples (not shown) the protocol controller 620 may identify that the protocol unit includes control information and may transmit the protocol unit to a controller (e.g., a command controller 350 as described with reference to FIG. 3).

At 652, the protocol controller 620 may transmit the protocol unit to the data storage controller 625. At 654, the data storage controller 625 may perform a parity check on the protocol unit. To perform the parity check, the data storage controller 625 may generate respective sets of parity bits (e.g., check bits) associated with the first data and the second data included in the protocol unit. For example, the interface controller may generate a third set of check bits (e.g., a sixth set of parity bits) using the first data and a fourth set of check bits (e.g., a seventh set of parity bits) using the second data. The data storage controller 625 may compare the third set of parity bits with the third set of check bits and may compare the fourth set of parity bits with the fourth set of check bits. If the sets of parity bits do not match, then an error may have occurred in a data path between the interface controller 615 and the data storage controller 625. If the parity bits match, the data storage controller 625 may generate a data storage unit for writing to the memory array 635.

At 656, the data storage controller 625 may process the protocol unit to obtain a data storage unit based on the parity bits matching (e.g., at 675). The data storage unit may include the first data and the second data, as well as a fifth set of parity bits. The fifth set of parity bits may be generated using the first data and the second data and may be referred to as end-to-end CRC bits. At 658, the data storage controller 625 may transmit the data storage unit to the buffer 630. At 660, the buffer 630 may transmit the data storage unit to the memory array 635 and the data and fifth set of parity bits may be written to a portion of the memory array 635. Accordingly, by detecting and correcting errors that occur along the data paths of the memory system 610 as described herein, the overall performance and reliability of the memory system 610 may be improved.

Figure 6B:
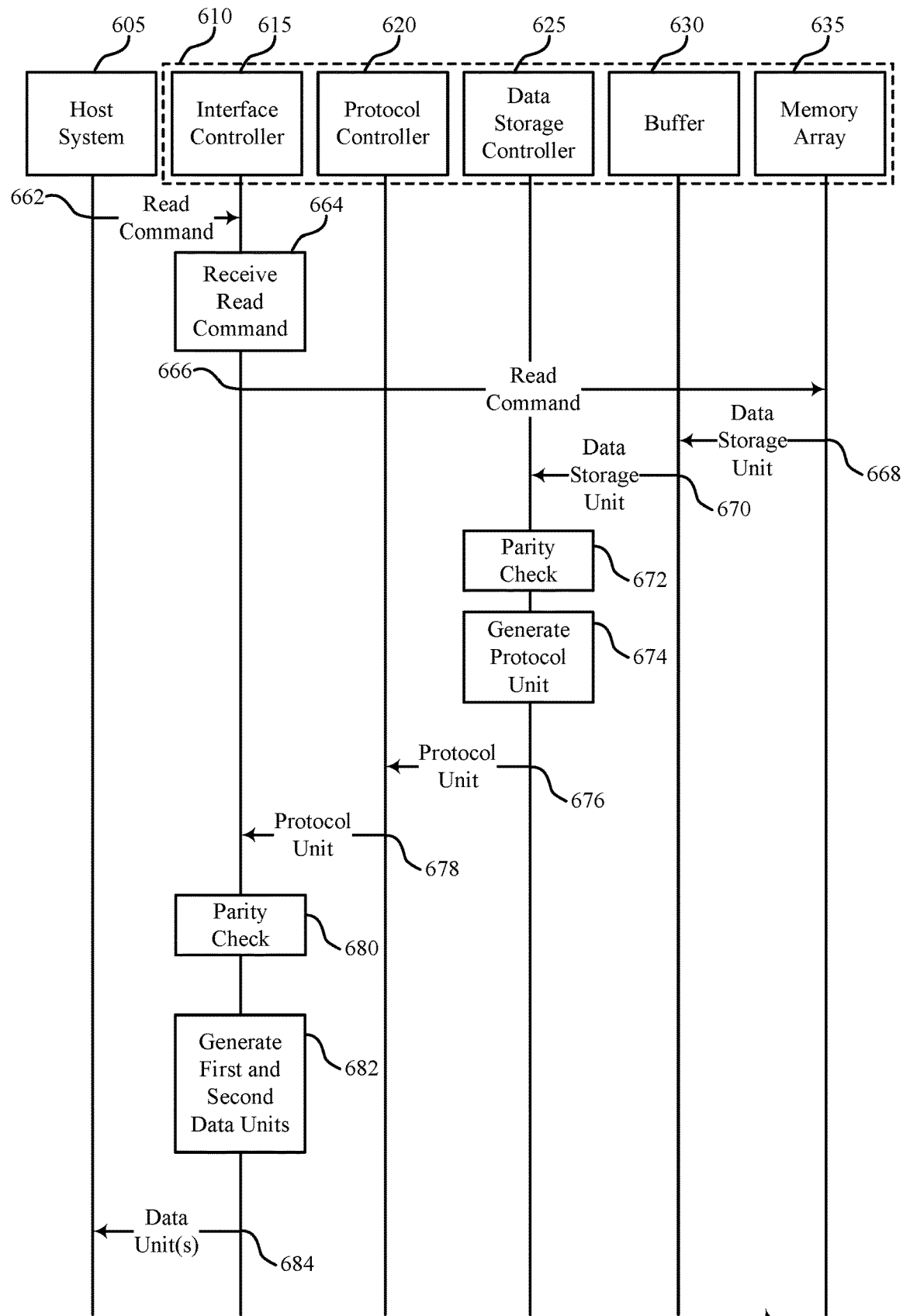

FIG. 6B illustrates an example of a process flow diagram 600-*b* that supports command and data path error protection in accordance with examples as disclosed herein. In some examples, the process flow diagram 600-*b* may illustrate a read operation performed at a memory system 610. The memory system 610 may be a same memory system and may include the same components as described with reference to FIG. 6A. The process flow diagram 600-*b* may illustrate the processing and generation of data units, protocol units, and data storage units, which may allow for the detection of errors in data paths of the memory system 610, which may improve its overall performance and reliability.

At 662, the host system 605 may transmit a read command to the memory system 610. The read command may be associated with data stored to the memory array 635. At 664, the interface controller 615 may receive the read command. At 666, the interface controller 615 may transmit the read command to the memory array 635. In some examples (not shown), the read command may be received directly by the memory array 635 (e.g., the memory array 635 may receive the read command directly from the host system 605) or may communicated to the memory array 635 via one or more components.

At 668, a data storage unit stored to the memory array 635 may be transmitted to the buffer. In some examples, the data storage unit may include first data and a first set of parity bits associated with the data and may be associated with the read command received from the host system 605. At 670, the data storage unit may be transmitted from the buffer to the data storage controller 625.

At 672, the data storage controller 625 may perform a parity check on the data storage unit. To perform the parity check, the data storage controller 625 may generate a first set of check bits (e.g., a sixth set of parity bits) using the first data included in the data storage unit. The data storage controller 625 may compare the first set of parity bits with the first set of check bits. If the sets of parity bits do not match, then an error may have occurred in a data path between the memory array 635 and the data storage controller 625. If the parity bits match, the data storage controller 625 may process the data storage unit to generate a protocol unit.

At 674, the data storage controller 625 may process the data storage unit to obtain a protocol unit (e.g., a UPIU). The protocol unit may include a first portion of the first data and a second portion of the first data. In some examples, the data storage controller may also generate respective sets of parity bits associated with the first and second portions of the first data. For example, the data storage controller 625 may generate a second set of parity bits using the first portion of the first data and may generate a third set of parity bits using the second portion of the first data. At 676, the data storage controller 625 may transmit the protocol unit to the protocol controller 620. At 678, the protocol controller 620 may transmit the protocol unit to the interface controller 615. In some examples, the protocol controller 620 may transmit the protocol unit to the interface controller 615 via a link controller (e.g., a link controller 320 as described with reference to FIG. 3).

At 680, the interface controller 615 may perform a parity check on the protocol unit. To perform the parity check, the interface controller 615 may generate respective sets of parity bits (e.g., check bits) associated with the first portion of the first data and the second portion of the first data. For example, the interface controller may generate a second set of check bits (e.g., a seventh set of parity bits) using the first portion of the first data and a third set of check bits (e.g., an eighth set of parity bits) using the second portion of the first data. The interface controller 615 may compare the second set of parity bits with the second set of check bits and may compare the third set of parity bits with the third set of check bits. If the sets of parity bits do not match, then an error may have occurred in a data path between the data storage controller 625 and the interface controller 615. In such examples, as described herein, the interface controller 615 may generate and corrupt one or more sets of parity bits to transmit to the host system 605, which may effectively notify the host system 605 that an error occurred.

At 682, the interface controller 682 may generate a first data unit and a second data unit. The first data unit may include a first set of fields that include the first portion of the first data and a fourth set of parity bits generated using the first portion of the first data. The second data unit may include a second set of fields that include the second portion of the first data and a fifth set of parity bits generated using the second portion of the first data. As described above, the interface controller 615 may corrupt the fourth set of parity bits and the fifth set of parity bits if the parity check (e.g., at 680) fails. If the parity check (e.g., at 680) does not fail (e.g., if the respective sets of parity bits match) then the interface controller 615 may not corrupt the fourth set of parity bits and the fifth set of parity bits.

At 684, the interface controller 615 may transmit the first data unit and the second data unit to the host system. In some examples, the host system may perform a parity check on the first and second data units (not shown) using the fourth set of parity bits and the fifth set of parity bits. Accordingly, by detecting and correcting errors that occur along the data paths of the memory system 610 as described herein, the overall performance and reliability of the memory system 610 may be improved.

Figure 7:
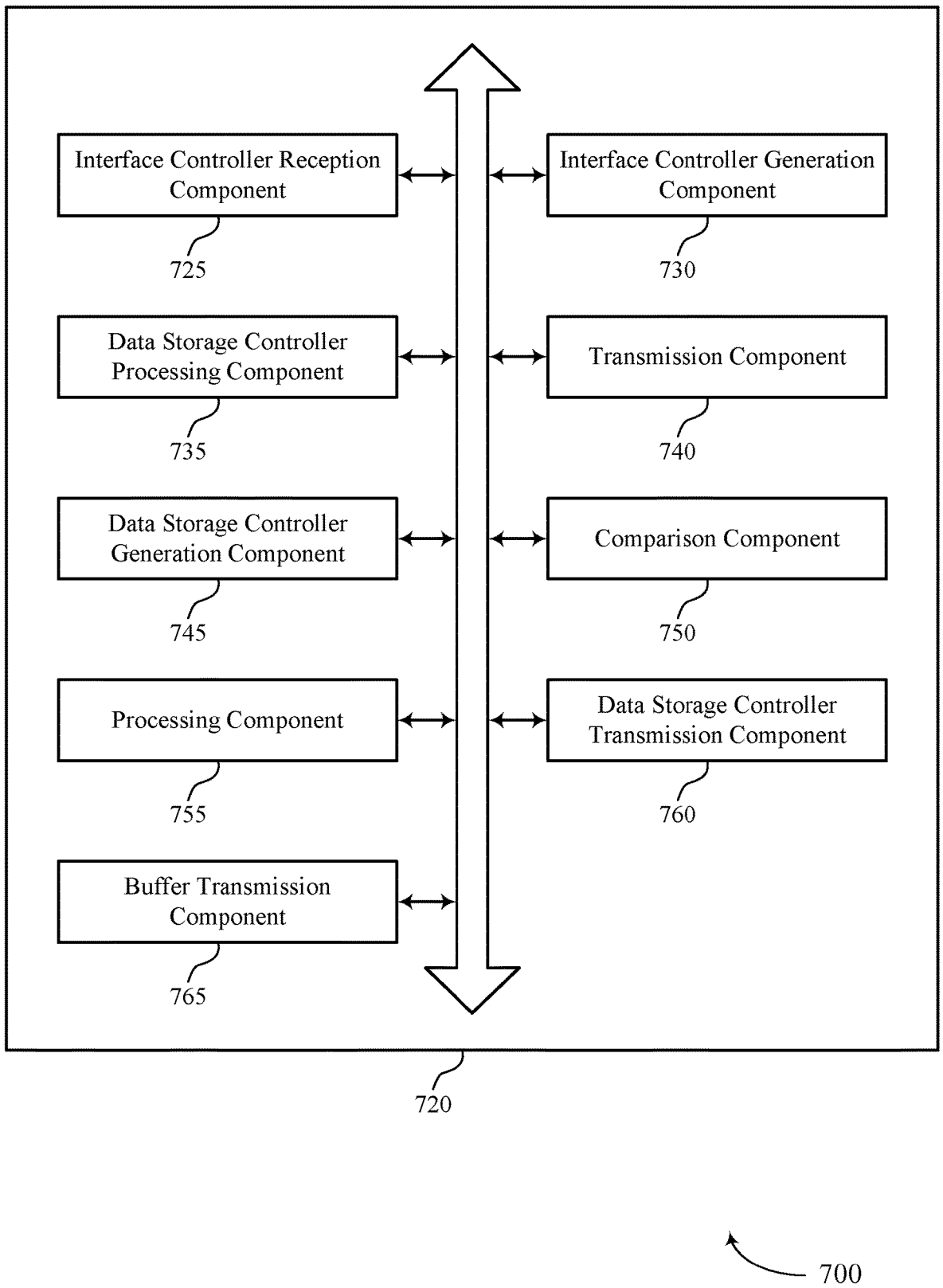
FIG. 7 shows a block diagram of a memory system 1 that supports command and data path error protection in accordance with examples as disclosed herein.

FIG. 7 shows a block diagram 700 of a memory system 720 that supports command and data path error protection in accordance with examples as disclosed herein. The memory system 720 may be an example of aspects of a memory system as described with reference to FIGS. 1 through 6. The memory system 720, or various components thereof, may be an example of means for performing various aspects of command and data path error protection as described herein. For example, the memory system 720 may include an interface controller reception component 725, an interface controller generation component 730, a data storage controller processing component 735, a transmission component 740, a data storage controller generation component 745, a comparison component 750, a processing component 755, a data storage controller transmission component 760, a buffer transmission component 765, or any combination thereof. Each of these components may communicate, directly or indirectly, with one another (e.g., via one or more buses).

The interface controller reception component 725 may be configured as or otherwise support a means for receiving, at an interface controller of a memory system, a first data unit including a first set of fields and a first set of parity bits associated with the first set of fields, and a second data unit including a second set of fields and a second set of parity bits associated with the second set of fields. In some examples, the interface controller reception component 725 may be configured as or otherwise support a means for receiving, at the interface controller, a first control unit including a first set of fields and a tenth set of parity bits associated with the first set of fields and a second control unit including a second set of fields and an eleventh set of parity bits associated with the second set of fields.

The interface controller generation component 730 may be configured as or otherwise support a means for generating, by the interface controller, a protocol unit based at least in part on receiving the first data unit and the second data unit, where the protocol unit includes first data from a subset of the first set of fields, a third set of parity bits generated using the first data, second data from a subset of the second set of fields, and a fourth set of parity bits generated using the second data. In some examples, the interface controller generation component 730 may be configured as or otherwise support a means for generating, by the interface controller, an eighth set of parity bits using the first data and a ninth set of parity bits using the second data based at least in part on receiving the first data unit and the second data unit.

In some examples, to support generating the protocol unit, the interface controller generation component 730 may be configured as or otherwise support a means for refraining from including the first set of parity bits and the second set of parity bits in the protocol unit based at least in part on the first set of parity bits matching the eighth set of parity bits and the second set of parity bits matching the ninth set of parity bits. In some examples, to support generating the protocol unit, the interface controller generation component 730 may be configured as or otherwise support a means for generating the third set of parity bits using the first data.

In some examples, to support generating the protocol unit, the interface controller generation component 730 may be configured as or otherwise support a means for generating the fourth set of parity bits using the second data, where the first data, the second data, the third set of parity bits, and the fourth set of parity bits are included in a field of the protocol unit. In some examples, the interface controller generation component 730 may be configured as or otherwise support a means for generating, by the interface controller, a second protocol unit based at least in part on receiving the first control unit and the second control unit, where the second protocol unit includes third data from a subset of the first set of fields, a twelfth set of parity bits generated using the third data, fourth data from a subset of the second set of fields, and a thirteenth set of parity bits generated using the fourth data.

The data storage controller processing component 735 may be configured as or otherwise support a means for processing, by a data storage controller of the memory system, the protocol unit to obtain a data storage unit, where the data storage unit includes the first data, the second data, and a fifth set of parity bits generated using the first data and the second data.

The transmission component 740 may be configured as or otherwise support a means for transmitting the data storage unit to a memory array of the memory system.

In some examples, the data storage controller generation component 745 may be configured as or otherwise support a means for generating, by the data storage controller, a sixth set of parity bits using the first data and a seventh set of parity bits using the second data. In some examples, to support generating the data storage unit, the data storage controller generation component 745 may be configured as or otherwise support a means for refraining from including the third set of parity bits and the fourth set of parity bits in the data storage unit based at least in part on the third set of parity bits matching the sixth set of parity bits and the fourth set of parity bits matching the seventh set of parity bits.

In some examples, the comparison component 750 may be configured as or otherwise support a means for comparing the third set of parity bits with the sixth set of parity bits. In some examples, the comparison component 750 may be configured as or otherwise support a means for comparing the fourth set of parity bits with the seventh set of parity bits, where generating the data storage unit is based at least in part on the third set of parity bits matching the sixth set of parity bits and the fourth set of parity bits matching the seventh set of parity bits.

In some examples, the comparison component 750 may be configured as or otherwise support a means for comparing the first set of parity bits with the eighth set of parity bits. In some examples, the comparison component 750 may be configured as or otherwise support a means for comparing the second set of parity bits with the ninth set of parity bits, where generating the protocol unit is based at least in part on the first set of parity bits matching the eighth set of parity bits and the second set of parity bits matching the ninth set of parity bits.

In some examples, the processing component 755 may be configured as or otherwise support a means for processing the second protocol unit by a memory controller of the memory system.

In some examples, to support transmitting the data storage unit to the memory array, the data storage controller transmission component 760 may be configured as or otherwise support a means for sending, by the data storage controller, the data storage unit to a buffer of the memory system.

In some examples, to support transmitting the data storage unit to the memory array, the buffer transmission component 765 may be configured as or otherwise support a means for transmitting, by the buffer, the data storage unit to the memory array.

In some examples, the first set of fields includes a start-of-data-frame field and an end-of-data-frame field. In some examples, the subset of the first set of fields excludes the start-of-data-frame field and the end-of-data-frame field. In some examples, the interface controller receives the first data unit and the second data unit via a physical interface including one or more serial data lanes. In some examples, the protocol unit includes a Universal Flash Storage Protocol Information Unit (UPIU).

Figure 8:
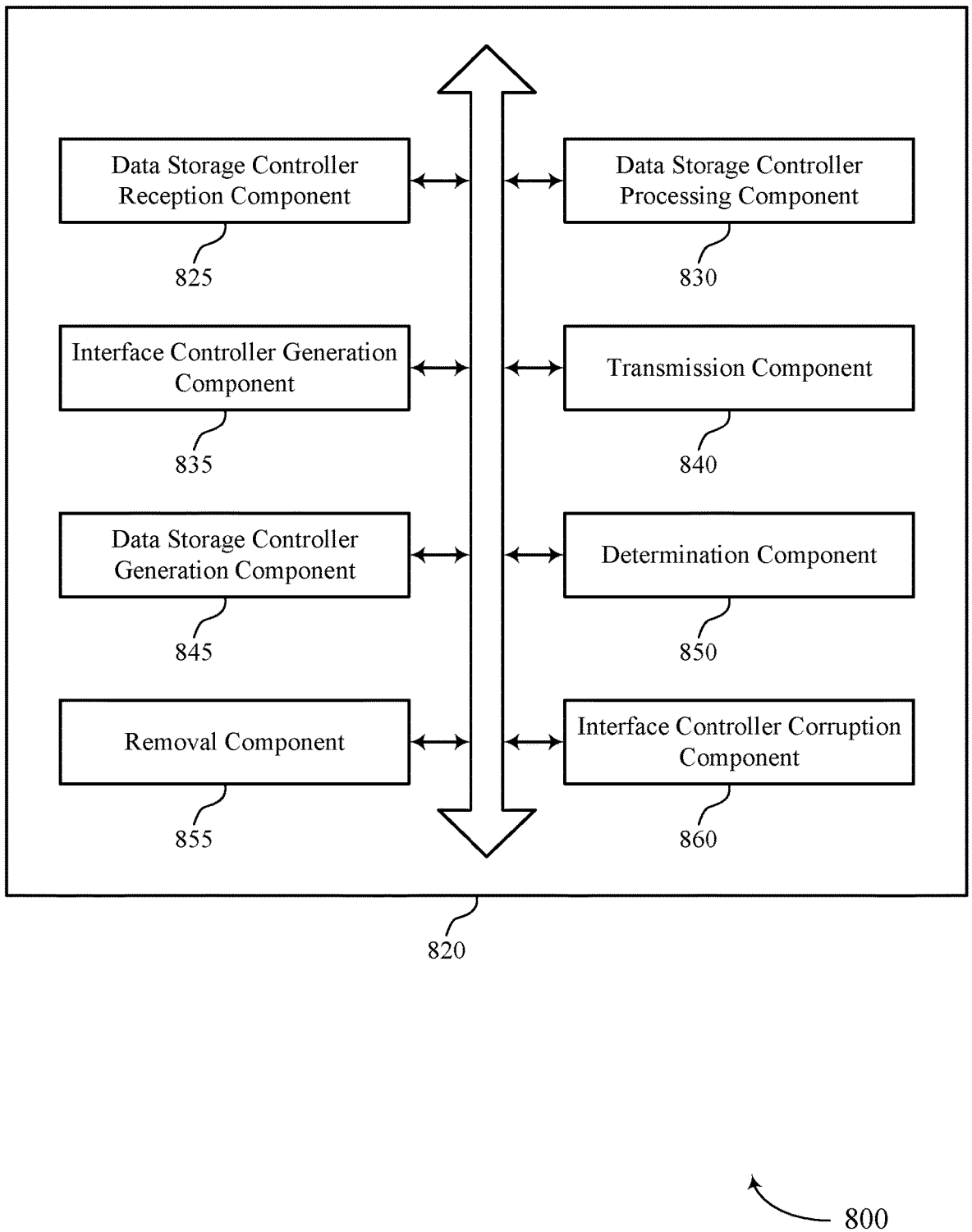
FIG. 8 shows a block diagram of a memory system 2 that supports command and data path error protection in accordance with examples as disclosed herein.

FIG. 8 shows a block diagram 800 of a memory system 820 that supports command and data path error protection in accordance with examples as disclosed herein. The memory system 820 may be an example of aspects of a memory system as described with reference to FIGS. 1 through 6. The memory system 820, or various components thereof, may be an example of means for performing various aspects of command and data path error protection as described herein. For example, the memory system 820 may include a data storage controller reception component 825, a data storage controller processing component 830, an interface controller generation component 835, a transmission component 840, a data storage controller generation component 845, a determination component 850, a removal component 855, an interface controller corruption component 860, or any combination thereof. Each of these components may communicate, directly or indirectly, with one another (e.g., via one or more buses).

The data storage controller reception component 825 may be configured as or otherwise support a means for receiving, at a data storage controller of a memory system, a data storage unit from a buffer of the memory system, where the data storage unit includes first data from a memory array of the memory system and a first set of parity bits associated with the first data.

The data storage controller processing component 830 may be configured as or otherwise support a means for processing, by the data storage controller based at least in part on receiving the data storage unit, the data storage unit to obtain a protocol unit, where the protocol unit includes a first portion of the first data, a second set of parity bits generated using the first portion of the first data, a second portion of the first data, and a third set of parity bits generated using the second portion of the first data.

The interface controller generation component 835 may be configured as or otherwise support a means for generating, by an interface controller of the memory system based at least in part on the protocol unit, a first data unit including a first set of fields and a fourth set of parity bits, and a second data unit including a second set of fields and a fifth set of parity bits, where a subset of the first set of fields includes the first portion of the first data and a subset of the second set of fields includes the second portion of the first data. In some examples, the interface controller generation component 835 may be configured as or otherwise support a means for generating, by the interface controller, a seventh set of parity bits using the first portion of the first data and an eighth set of parity bits using the second portion of the first data.

The transmission component 840 may be configured as or otherwise support a means for transmitting the first data unit and the second data unit to a host device. In some examples, to support transmitting the protocol unit and the fifth set of parity bits to the host device, the transmission component 840 may be configured as or otherwise support a means for transmitting a plurality of repetitions of the first data unit including the corrupted fourth set of parity bits or the corrupted fifth set of parity bits.

In some examples, the data storage controller generation component 845 may be configured as or otherwise support a means for generating, by the data storage controller, a sixth set of parity bits from the first data.

In some examples, the determination component 850 may be configured as or otherwise support a means for determining that the first set of parity bits matches the sixth set of parity bits, where generating the protocol unit is based at least in part on determining that the first set of parity bits matches the sixth set of parity bits. In some examples, the determination component 850 may be configured as or otherwise support a means for determining whether the second set of parity bits matches the seventh set of parity bits and whether the third set of parity bits matches the eighth set of parity bits.

In some examples, the removal component 855 may be configured as or otherwise support a means for removing the first set of parity bits from the data storage unit based at least in part on determining that the first set of parity bits matches the sixth set of parity bits. In some examples, the removal component 855 may be configured as or otherwise support a means for removing the second set of parity bits and the third set of parity bits from the protocol unit based at least in part on determining that the second set of parity bits matches the sixth set of parity bits and the third set of parity bits matches the seventh set of parity bits.

In some examples, the interface controller corruption component 860 may be configured as or otherwise support a means for corrupting, by the interface controller, the fourth set of parity bits or the fifth set of parity bits based at least in part on determining that the second set of parity bits does not match the seventh set of parity bits, that the third set of parity bits does not match the eighth set of parity bits, or both.

Figure 9:
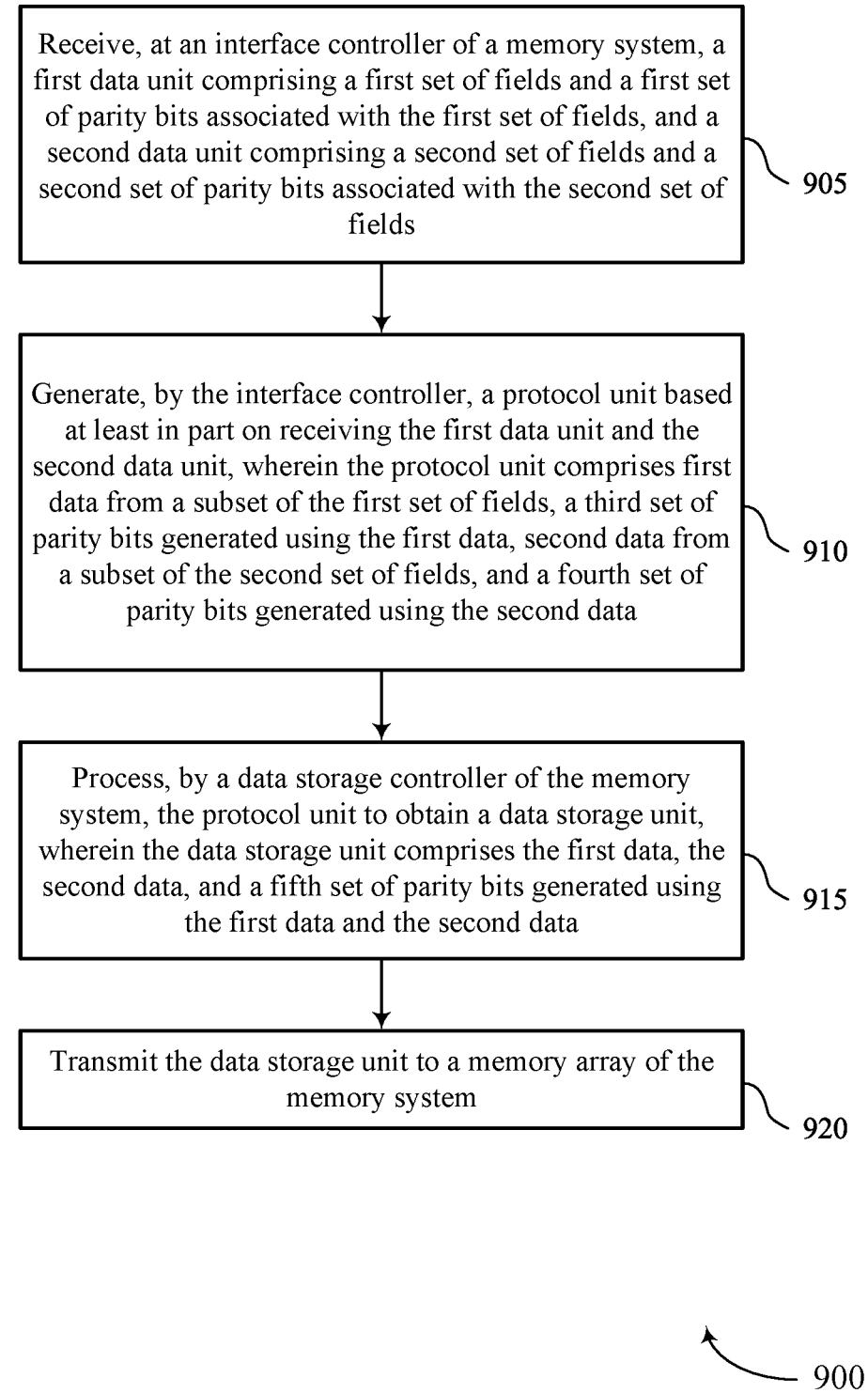
FIGS. 9 and 10 show flowcharts illustrating a method or methods that support command and data path error protection in accordance with examples as disclosed herein.

FIG. 9 shows a flowchart illustrating a method 900 that supports command and data path error protection in accordance with examples as disclosed herein. The operations of method 900 may be implemented by a memory system or its components as described herein. For example, the operations of method 900 may be performed by a memory system as described with reference to FIGS. 1 through 7. In some examples, a memory system may execute a set of instructions to control the functional elements of the device to perform the described functions. Additionally or alternatively, the memory system may perform aspects of the described functions using special-purpose hardware.

At 905, the method may include receiving, at an interface controller of a memory system, a first data unit including a first set of fields and a first set of parity bits associated with the first set of fields, and a second data unit including a second set of fields and a second set of parity bits associated with the second set of fields. The operations of 905 may be performed in accordance with examples as disclosed herein. In some examples, aspects of the operations of 905 may be performed by an interface controller reception component 725 as described with reference to FIG. 7.

At 910, the method may include generating, by the interface controller, a protocol unit based at least in part on receiving the first data unit and the second data unit, where the protocol unit includes first data from a subset of the first set of fields, a third set of parity bits generated using the first data, second data from a subset of the second set of fields, and a fourth set of parity bits generated using the second data. The operations of 910 may be performed in accordance with examples as disclosed herein. In some examples, aspects of the operations of 910 may be performed by an interface controller generation component 730 as described with reference to FIG. 7.

At 915, the method may include processing, by a data storage controller of the memory system, the protocol unit to obtain a data storage unit, where the data storage unit includes the first data, the second data, and a fifth set of parity bits generated using the first data and the second data. The operations of 915 may be performed in accordance with examples as disclosed herein. In some examples, aspects of the operations of 915 may be performed by a data storage controller processing component 735 as described with reference to FIG. 7.

At 920, the method may include transmitting the data storage unit to a memory array of the memory system. The operations of 920 may be performed in accordance with examples as disclosed herein. In some examples, aspects of the operations of 920 may be performed by a transmission component 740 as described with reference to FIG. 7.

In some examples, an apparatus as described herein may perform a method or methods, such as the method 900. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for receiving, at an interface controller of a memory system, a first data unit including a first set of fields and a first set of parity bits associated with the first set of fields, and a second data unit including a second set of fields and a second set of parity bits associated with the second set of fields; generating, by the interface controller, a protocol unit based at least in part on receiving the first data unit and the second data unit, where the protocol unit includes first data from a subset of the first set of fields, a third set of parity bits generated using the first data, second data from a subset of the second set of fields, and a fourth set of parity bits generated using the second data; processing, by a data storage controller of the memory system, the protocol unit to obtain a data storage unit, where the data storage unit includes the first data, the second data, and a fifth set of parity bits generated using the first data and the second data; and transmitting the data storage unit to a memory array of the memory system.

Aspect 2: The method, apparatus, or non-transitory computer-readable medium of aspect 1, further including operations, features, circuitry, logic, means, or instructions, or any combination thereof for generating, by the data storage controller, a sixth set of parity bits using the first data and a seventh set of parity bits using the second data; comparing the third set of parity bits with the sixth set of parity bits; and comparing the fourth set of parity bits with the seventh set of parity bits, where generating the data storage unit is based at least in part on the third set of parity bits matching the sixth set of parity bits and the fourth set of parity bits matching the seventh set of parity bits.

Aspect 3: The method, apparatus, or non-transitory computer-readable medium of aspect 2 where generating the data storage unit includes operations, features, circuitry, logic, means, or instructions, or any combination thereof for refraining from including the third set of parity bits and the fourth set of parity bits in the data storage unit based at least in part on the third set of parity bits matching the sixth set of parity bits and the fourth set of parity bits matching the seventh set of parity bits.

Aspect 4: The method, apparatus, or non-transitory computer-readable medium of any of aspects 1 through 3, further including operations, features, circuitry, logic, means, or instructions, or any combination thereof for generating, by the interface controller, an eighth set of parity bits using the first data and a ninth set of parity bits using the second data based at least in part on receiving the first data unit and the second data unit; comparing the first set of parity bits with the eighth set of parity bits; and comparing the second set of parity bits with the ninth set of parity bits, where generating the protocol unit is based at least in part on the first set of parity bits matching the eighth set of parity bits and the second set of parity bits matching the ninth set of parity bits.

Aspect 5: The method, apparatus, or non-transitory computer-readable medium of aspect 4 where generating the protocol unit includes operations, features, circuitry, logic, means, or instructions, or any combination thereof for refraining from including the first set of parity bits and the second set of parity bits in the protocol unit based at least in part on the first set of parity bits matching the eighth set of parity bits and the second set of parity bits matching the ninth set of parity bits.

Aspect 6: The method, apparatus, or non-transitory computer-readable medium of any of aspects 1 through 5 where generating the protocol unit includes operations, features, circuitry, logic, means, or instructions, or any combination thereof for generating the third set of parity bits using the first data and generating the fourth set of parity bits using the second data, where the first data, the second data, the third set of parity bits, and the fourth set of parity bits are included in a field of the protocol unit.

Aspect 7: The method, apparatus, or non-transitory computer-readable medium of any of aspects 1 through 6 where the first set of fields includes a start-of-data-frame field and an end-of-data-frame field and the subset of the first set of fields excludes the start-of-data-frame field and the end-of-data-frame field.

Aspect 8: The method, apparatus, or non-transitory computer-readable medium of any of aspects 1 through 7 where the interface controller receives the first data unit and the second data unit via a physical interface including one or more serial data lanes.

Aspect 9: The method, apparatus, or non-transitory computer-readable medium of any of aspects 1 through 8 where the protocol unit includes a Universal Flash Storage Protocol Information Unit (UPIU).

Aspect 10: The method, apparatus, or non-transitory computer-readable medium of any of aspects 1 through 9, further including operations, features, circuitry, logic, means, or instructions, or any combination thereof for receiving, at the interface controller, a first control unit including a first set of fields and a tenth set of parity bits associated with the first set of fields and a second control unit including a second set of fields and an eleventh set of parity bits associated with the second set of fields; generating, by the interface controller, a second protocol unit based at least in part on receiving the first control unit and the second control unit, where the second protocol unit includes third data from a subset of the first set of fields, a twelfth set of parity bits generated using the third data, fourth data from a subset of the second set of fields, and a thirteenth set of parity bits generated using the fourth data; and processing the second protocol unit by a memory controller of the memory system.

Aspect 11: The method, apparatus, or non-transitory computer-readable medium of any of aspects 1 through 10 where transmitting the data storage unit to the memory array includes operations, features, circuitry, logic, means, or instructions, or any combination thereof for sending, by the data storage controller, the data storage unit to a buffer of the memory system and transmitting, by the buffer, the data storage unit to the memory array.

Figure 10:
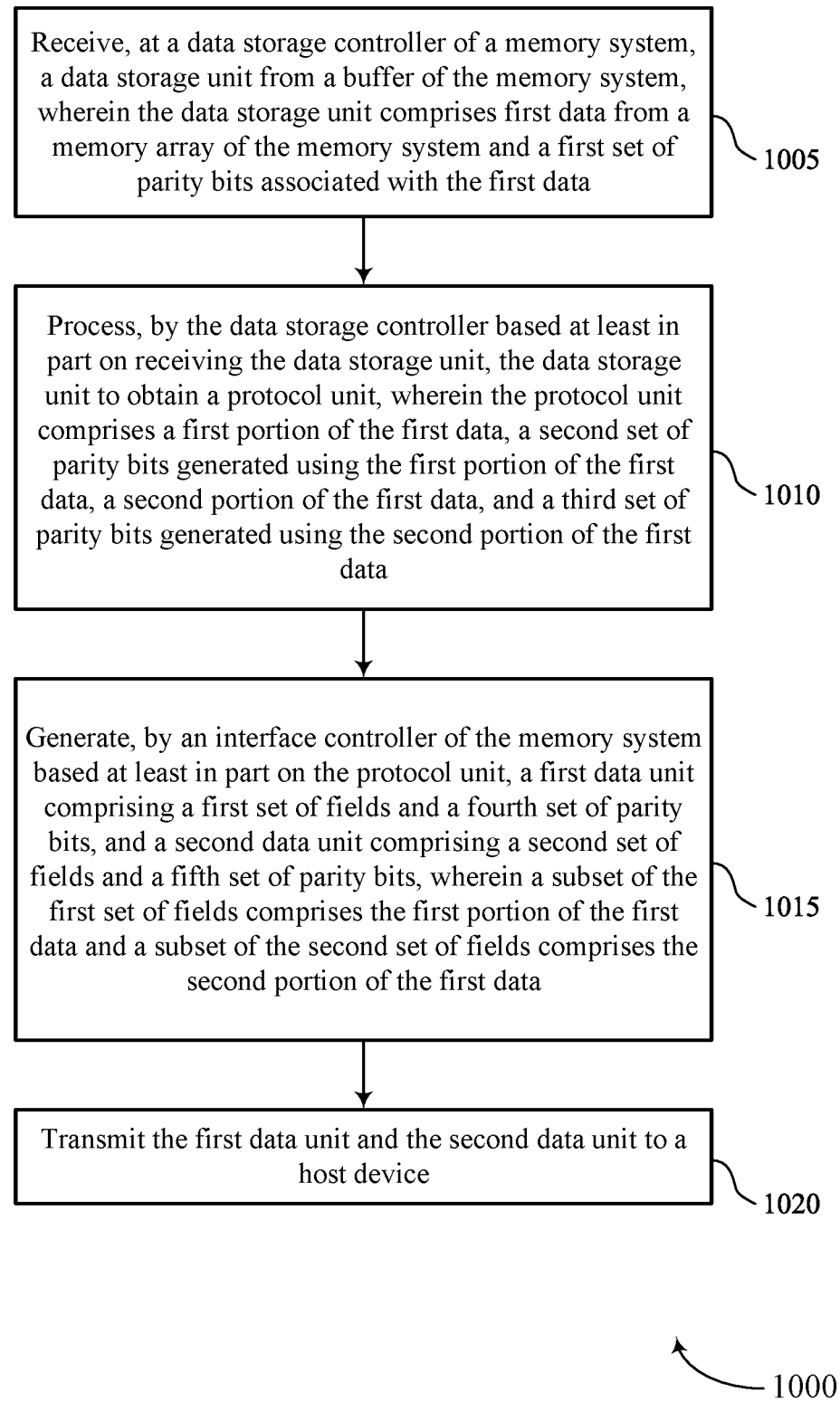

FIG. 10 shows a flowchart illustrating a method 1000 that supports command and data path error protection in accordance with examples as disclosed herein. The operations of method 1000 may be implemented by a memory system or its components as described herein. For example, the operations of method 1000 may be performed by a memory system as described with reference to FIGS. 1 through 6 and 8. In some examples, a memory system may execute a set of instructions to control the functional elements of the device to perform the described functions. Additionally or alternatively, the memory system may perform aspects of the described functions using special-purpose hardware.

At 1005, the method may include receiving, at a data storage controller of a memory system, a data storage unit from a buffer of the memory system, where the data storage unit includes first data from a memory array of the memory system and a first set of parity bits associated with the first data. The operations of 1005 may be performed in accordance with examples as disclosed herein. In some examples, aspects of the operations of 1005 may be performed by a data storage controller reception component 825 as described with reference to FIG. 8.

At 1010, the method may include processing, by the data storage controller based at least in part on receiving the data storage unit, the data storage unit to obtain a protocol unit, where the protocol unit includes a first portion of the first data, a second set of parity bits generated using the first portion of the first data, a second portion of the first data, and a third set of parity bits generated using the second portion of the first data. The operations of 1010 may be performed in accordance with examples as disclosed herein. In some examples, aspects of the operations of 1010 may be performed by a data storage controller processing component 830 as described with reference to FIG. 8.

At 1015, the method may include generating, by an interface controller of the memory system based at least in part on the protocol unit, a first data unit including a first set of fields and a fourth set of parity bits, and a second data unit including a second set of fields and a fifth set of parity bits, where a subset of the first set of fields includes the first portion of the first data and a subset of the second set of fields includes the second portion of the first data. The operations of 1015 may be performed in accordance with examples as disclosed herein. In some examples, aspects of the operations of 1015 may be performed by an interface controller generation component 835 as described with reference to FIG. 8.

At 1020, the method may include transmitting the first data unit and the second data unit to a host device. The operations of 1020 may be performed in accordance with examples as disclosed herein. In some examples, aspects of the operations of 1020 may be performed by a transmission component 840 as described with reference to FIG. 8.

In some examples, an apparatus as described herein may perform a method or methods, such as the method 1000. The apparatus may include features, circuitry, logic, means, or instructions (e.g., a non-transitory computer-readable medium storing instructions executable by a processor), or any combination thereof for performing the following aspects of the present disclosure:

Aspect 12: A method, apparatus, or non-transitory computer-readable medium including operations, features, circuitry, logic, means, or instructions, or any combination thereof for receiving, at a data storage controller of a memory system, a data storage unit from a buffer of the memory system, where the data storage unit includes first data from a memory array of the memory system and a first set of parity bits associated with the first data; processing, by the data storage controller based at least in part on receiving the data storage unit, the data storage unit to obtain a protocol unit, where the protocol unit includes a first portion of the first data, a second set of parity bits generated using the first portion of the first data, a second portion of the first data, and a third set of parity bits generated using the second portion of the first data; generating, by an interface controller of the memory system based at least in part on the protocol unit, a first data unit including a first set of fields and a fourth set of parity bits, and a second data unit including a second set of fields and a fifth set of parity bits, where a subset of the first set of fields includes the first portion of the first data and a subset of the second set of fields includes the second portion of the first data; and transmitting the first data unit and the second data unit to a host device.

Aspect 13: The method, apparatus, or non-transitory computer-readable medium of aspect 12, further including operations, features, circuitry, logic, means, or instructions, or any combination thereof for generating, by the data storage controller, a sixth set of parity bits from the first data and determining that the first set of parity bits matches the sixth set of parity bits, where generating the protocol unit is based at least in part on determining that the first set of parity bits matches the sixth set of parity bits.

Aspect 14: The method, apparatus, or non-transitory computer-readable medium of aspect 13, further including operations, features, circuitry, logic, means, or instructions, or any combination thereof for removing the first set of parity bits from the data storage unit based at least in part on determining that the first set of parity bits matches the sixth set of parity bits.

Aspect 15: The method, apparatus, or non-transitory computer-readable medium of any of aspects 12 through 14, further including operations, features, circuitry, logic, means, or instructions, or any combination thereof for generating, by the interface controller, a seventh set of parity bits using the first portion of the first data and an eighth set of parity bits using the second portion of the first data and determining whether the second set of parity bits matches the seventh set of parity bits and whether the third set of parity bits matches the eighth set of parity bits.

Aspect 16: The method, apparatus, or non-transitory computer-readable medium of aspect 15, further including operations, features, circuitry, logic, means, or instructions, or any combination thereof for corrupting, by the interface controller, the fourth set of parity bits or the fifth set of parity bits based at least in part on determining that the second set of parity bits does not match the seventh set of parity bits, that the third set of parity bits does not match the eighth set of parity bits, or both.

Aspect 17: The method, apparatus, or non-transitory computer-readable medium of aspect 16 where transmitting the protocol unit and the fifth set of parity bits to the host device includes operations, features, circuitry, logic, means, or instructions, or any combination thereof for transmitting a plurality of repetitions of the first data unit including the corrupted fourth set of parity bits or the corrupted fifth set of parity bits.

Aspect 18: The method, apparatus, or non-transitory computer-readable medium of any of aspects 15 through 17, further including operations, features, circuitry, logic, means, or instructions, or any combination thereof for removing the second set of parity bits and the third set of parity bits from the protocol unit based at least in part on determining that the second set of parity bits matches the sixth set of parity bits and the third set of parity bits matches the seventh set of parity bits.

It should be noted that the methods described above describe possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

As used herein, the term "substantially" means that the modified characteristic (e.g., a verb or adjective modified by the term substantially) need not be absolute but is close enough to achieve the advantages of the characteristic.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed and second condition or action may at least partially occur as a result of the previous condition or action occurring (whether directly after or after one or more other intermediate conditions or actions occurring after the first condition or action).

Additionally, the terms "directly in response to" or "in direct response to" may refer to one condition or action occurring as a direct result of a previous condition or action. In some examples, a first condition or action may be performed and second condition or action may occur directly as a result of the previous condition or action occurring independent of whether other conditions or actions occur. In some examples, a first condition or action may be performed and second condition or action may occur directly as a result of the previous condition or action occurring, such that no other intermediate conditions or actions occur between the earlier condition or action and the second condition or action or a limited quantity of one or more intermediate steps or actions occur between the earlier condition or action and the second condition or action. Any condition or action described herein as being performed "based on," "based at least in part on," or "in response to" some other step, action, event, or condition may additionally or alternatively (e.g., in an alternative example) be performed "in direct response to" or "directly in response to" such other condition or action unless otherwise specified.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus, comprising:
a memory array;
an interface controller configured to:
receive a plurality of data units comprising a first data unit comprising a first set of fields and a first set of parity bits associated with the first set of fields, and a second data unit comprising a second set of fields and a second set of parity bits associated with the second set of fields; and
generate, based at least in part on determining that the first data unit and the second data unit are associated with a common destination identifier, a protocol unit comprising first data from a subset of the first set of fields, a third set of parity bits generated using the first data, second data from a subset of the second set of fields, and a fourth set of parity bits generated using the second data, wherein generating the protocol unit is based at least in part on performing a first error checking process on the first data and the second data using the first set of parity bits and the second set of parity bits; and a data storage controller coupled with the interface controller, wherein the data storage controller is configured to:
  process the protocol unit to obtain a data storage unit based at least in part on performing a second error checking process on the first data and the second data using the third set of parity bits and the fourth set of parity bits, wherein the data storage unit comprises the first data, the second data, and a fifth set of parity bits generated using both the first data and the second data; and
  transmit the data storage unit to the memory array.

2. The apparatus of claim 1, wherein the data storage controller is configured to:
  generate a sixth set of parity bits using the first data and a seventh set of parity bits using the second data;
  compare the third set of parity bits with the sixth set of parity bits; and
  compare the fourth set of parity bits with the seventh set of parity bits, wherein generating the data storage unit is based at least in part on the third set of parity bits matching the sixth set of parity bits and the fourth set of parity bits matching the seventh set of parity bits.

3. The apparatus of claim 2, wherein the data storage controller is configured to:
  refrain from including the third set of parity bits and the fourth set of parity bits in the data storage unit based at least in part on the third set of parity bits matching the sixth set of parity bits and the fourth set of parity bits matching the seventh set of parity bits.

4. The apparatus of claim 1, wherein the interface controller is configured to:
  generate an eighth set of parity bits using the first data and a ninth set of parity bits using the second data based at least in part on receiving the first data unit and the second data unit;
  compare the first set of parity bits with the eighth set of parity bits; and
  compare the second set of parity bits with the ninth set of parity bits, wherein generating the protocol unit is based at least in part on the first set of parity bits matching the eighth set of parity bits and the second set of parity bits matching the ninth set of parity bits.

5. The apparatus of claim 4, wherein, to generate the protocol unit, the interface controller is configured to:
  refrain from including the first set of parity bits and the second set of parity bits in the protocol unit based at least in part on the first set of parity bits matching the eighth set of parity bits and the second set of parity bits matching the ninth set of parity bits.

6. The apparatus of claim 1, wherein, to generate the protocol unit, the interface controller is configured to:
  generate the third set of parity bits using the first data, and generate the fourth set of parity bits using the second data, wherein the first data, the second data, the third set of parity bits, and the fourth set of parity bits are included in a field of the protocol unit.

7. The apparatus of claim 1, wherein:
  the first set of fields comprises a start-of-data-frame field and an end-of-data-frame field, and
  the subset of the first set of fields excludes the start-of-data-frame field and the end-of-data-frame field.

8. The apparatus of claim 1, wherein the interface controller receives the first data unit and the second data unit via a physical interface comprising one or more serial data lanes.

9. The apparatus of claim 1, wherein the protocol unit comprises a Universal Flash Storage Protocol Information Unit (UPIU).

10. The apparatus of claim 1, wherein the interface controller is configured to:
  receive a first control unit comprising a first set of fields and a tenth set of parity bits associated with the first set of fields and a second control unit comprising a second set of fields and an eleventh set of parity bits associated with the second set of fields;
  generate a second protocol unit based at least in part on receiving the first control unit and the second control unit, wherein the second protocol unit comprises third data from a subset of the first set of fields, a twelfth set of parity bits generated using the third data, fourth data from a subset of the second set of fields, and a thirteenth set of parity bits generated using the fourth data; and
  process the second protocol unit.

11. The apparatus of claim 1, further comprising:
  a buffer, wherein, to transmit the data storage unit to the memory array, the data storage controller is configured to:
    send the data storage unit to the buffer, wherein the buffer is configured to:
      transmit the data storage unit to the memory array.

12. An apparatus, comprising:
  a memory array;
  a data storage controller configured to:
    receive a data storage unit from a buffer, wherein the data storage unit comprises first data from the memory array and a first set of parity bits associated with the first data; and
    process, by the data storage controller based at least in part on receiving the data storage unit, the data storage unit to obtain a protocol unit comprising a first portion of the first data, a second set of parity bits generated using the first portion of the first data, a second portion of the first data, and a third set of parity bits generated using the second portion of the first data, wherein obtaining the protocol unit is based at least in part on performing an error checking process on the first data using the first set of parity bits; and
  an interface controller coupled with the data storage controller, the interface controller configured to:
    generate, based at least in part on the protocol unit, a plurality of data units comprising a first data unit comprising a first set of fields and a fourth set of parity bits, and a second data unit comprising a second set of fields and a fifth set of parity bits, wherein a subset of the first set of fields comprises the first portion of the first data and a subset of the second set of fields comprises the second portion of the first data; and
    transmit the first data unit and the second data unit to a host device.

13. The apparatus of claim 12, wherein the data storage controller is configured to:
  generate a sixth set of parity bits from the first data; and
  determine that the first set of parity bits matches the sixth set of parity bits, wherein generating the protocol unit is based at least in part on determining that the first set of parity bits matches the sixth set of parity bits.

14. The apparatus of claim 13, wherein the data storage controller is configured to:

remove the first set of parity bits from the data storage unit based at least in part on determining that the first set of parity bits matches the sixth set of parity bits.

15. The apparatus of claim 12, wherein the interface controller is configured to:
generate a seventh set of parity bits using the first portion of the first data and an eighth set of parity bits using the second portion of the first data; and
determine whether the second set of parity bits matches the seventh set of parity bits and whether the third set of parity bits matches the eighth set of parity bits.

16. The apparatus of claim 15, wherein the interface controller is configured to:
corrupt the fourth set of parity bits or the fifth set of parity bits based at least in part on determining that the second set of parity bits does not match the seventh set of parity bits, that the third set of parity bits does not match the eighth set of parity bits, or both.

17. The apparatus of claim 16, wherein, to transmit the protocol unit and the fifth set of parity bits to the host device, the interface controller is configured to:
transmit a plurality of repetitions of the first data unit comprising the corrupted fourth set of parity bits or the corrupted fifth set of parity bits.

18. The apparatus of claim 15, wherein the interface controller is configured to:
remove the second set of parity bits and the third set of parity bits from the protocol unit based at least in part on determining that the second set of parity bits matches a sixth set of parity bits and the third set of parity bits matches the seventh set of parity bits.

19. A method, comprising:
receiving, at an interface controller of a memory system, a plurality of data units comprising a first data unit comprising a first set of fields and a first set of parity bits associated with the first set of fields, and a second data unit comprising a second set of fields and a second set of parity bits associated with the second set of fields;
generating, by the interface controller and based at least in part on determining that the first data unit and the second data unit are associated with a common destination identifier, a protocol unit comprising first data from a subset of the first set of fields, a third set of parity bits generated using the first data, second data from a subset of the second set of fields, and a fourth set of parity bits generated using the second data, wherein generating the protocol unit is based at least in part on performing a first error checking process on the first data and the second data using the first set of parity bits and the second set of parity bits;
processing, by a data storage controller of the memory system and based at least in part on performing a second error checking process on the first data and the second data using the third set of parity bits and the fourth set of parity bits, the protocol unit to obtain a data storage unit, wherein the data storage unit comprises the first data, the second data, and a fifth set of parity bits generated using the first data and the second data; and
transmitting the data storage unit to a memory array of the memory system.

20. The method of claim 19, further comprising:
generating, by the data storage controller, a sixth set of parity bits using the first data and a seventh set of parity bits using the second data;
comparing the third set of parity bits with the sixth set of parity bits; and
comparing the fourth set of parity bits with the seventh set of parity bits, wherein generating the data storage unit is based at least in part on the third set of parity bits matching the sixth set of parity bits and the fourth set of parity bits matching the seventh set of parity bits.

21. The method of claim 20, wherein generating the data storage unit comprises:
refraining from including the third set of parity bits and the fourth set of parity bits in the data storage unit based at least in part on the third set of parity bits matching the sixth set of parity bits and the fourth set of parity bits matching the seventh set of parity bits.

22. The method of claim 19, further comprising:
generating, by the interface controller, an eighth set of parity bits using the first data and a ninth set of parity bits using the second data based at least in part on receiving the first data unit and the second data unit;
comparing the first set of parity bits with the eighth set of parity bits; and
comparing the second set of parity bits with the ninth set of parity bits, wherein generating the protocol unit is based at least in part on the first set of parity bits matching the eighth set of parity bits and the second set of parity bits matching the ninth set of parity bits.

23. A method, comprising:
receiving, at a data storage controller of a memory system, a data storage unit from a buffer of the memory system, wherein the data storage unit comprises first data from a memory array of the memory system and a first set of parity bits associated with the first data;
processing, by the data storage controller based at least in part on receiving the data storage unit, the data storage unit to obtain a protocol unit comprising a first portion of the first data, a second set of parity bits generated using the first portion of the first data, a second portion of the first data, and a third set of parity bits generated using the second portion of the first data, wherein obtaining the protocol unit is based at least in part on performing an error checking process on the first data using the first set of parity bits;
generating, by an interface controller of the memory system based at least in part on the protocol unit, a plurality of data units comprising a first data unit comprising a first set of fields and a fourth set of parity bits, and a second data unit comprising a second set of fields and a fifth set of parity bits, wherein a subset of the first set of fields comprises the first portion of the first data and a subset of the second set of fields comprises the second portion of the first data; and
transmitting the first data unit and the second data unit to a host device.

24. The method of claim 23, further comprising:
generating, by the data storage controller, a sixth set of parity bits from the first data; and
determining that the first set of parity bits matches the sixth set of parity bits, wherein generating the protocol unit is based at least in part on determining that the first set of parity bits matches the sixth set of parity bits.

25. The method of claim 24, further comprising:
removing the first set of parity bits from the data storage unit based at least in part on determining that the first set of parity bits matches the sixth set of parity bits.

* * * * *